US008751159B2

(12) United States Patent
Hall

(10) Patent No.: US 8,751,159 B2
(45) Date of Patent: Jun. 10, 2014

(54) AUGMENTED REALITY GAMING VIA GEOGRAPHIC MESSAGING

(75) Inventor: Robert J Hall, Berkeley Heig, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1124 days.

(21) Appl. No.: 12/644,293

(22) Filed: Dec. 22, 2009

(65) Prior Publication Data

US 2011/0102459 A1    May 5, 2011

Related U.S. Application Data

(60) Provisional application No. 61/258,167, filed on Nov. 4, 2009.

(51) Int. Cl.
*A63F 13/34* (2014.01)
*A63F 13/332* (2014.01)

(52) U.S. Cl.
USPC .............................. 701/467; 701/465; 463/42

(58) Field of Classification Search
USPC ............... 701/465, 467; 434/11, 38; 345/633; 340/10.32; 342/45; 463/41, 42
See application file for complete search history.

(56) References Cited

U.S. PATENT DOCUMENTS

| | | | |
|---|---|---|---|
| 6,015,344 A | 1/2000 | Kelly et al. | |
| 6,119,976 A * | 9/2000 | Rogers | 244/13 |
| 6,195,751 B1 | 2/2001 | Caronni et al. | |
| 6,304,556 B1 | 10/2001 | Haas | |
| 6,628,620 B1 | 9/2003 | Cain | |
| 6,781,971 B1 | 8/2004 | Davis et al. | |
| 6,807,165 B2 | 10/2004 | Belcea | |
| 6,816,460 B1 | 11/2004 | Ahmed et al. | |
| 6,870,846 B2 | 3/2005 | Cain | |
| 6,879,574 B2 | 4/2005 | Naghian et al. | |
| 6,909,706 B2 | 6/2005 | Wilmer et al. | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |

(Continued)

FOREIGN PATENT DOCUMENTS

WO    WO 2007016641 A2 *  2/2007

OTHER PUBLICATIONS

Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.*

(Continued)

*Primary Examiner* — Behrang Badii
*Assistant Examiner* — David Testardi
(74) *Attorney, Agent, or Firm* — Baker & Hostetler LLP

(57) ABSTRACT

Geographic gaming via a scalable, wireless geographic broadcast protocol enables multiplayer gaming between communication devices without relying on traditional network elements. Games can be fully distributed over an ad hoc network of mobile communications devices. The scalable nature of the wireless geographic broadcast protocol enables multiplayer games to function equally well in both remote areas with no or little network service and in crowded areas containing both game players and other users of mobile communications devices. Wireless geographic broadcast messages distributed among multiplayer game participants can be used to control gameplay features and/or game elements of multiplayer games. Embodiments include simulated artillery battles, simulated throw and catch games, and simulated reconnaissance elements.

19 Claims, 14 Drawing Sheets

(56) References Cited

U.S. PATENT DOCUMENTS

| | | | |
|---|---|---|---|
| 6,958,986 B2 | 10/2005 | Cain | |
| 7,027,822 B1 | 4/2006 | Hwang et al. | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,525,933 B1 | 4/2009 | Hall | |
| 7,613,467 B2 | 11/2009 | Fleischman | |
| 7,813,326 B1 | 10/2010 | Kelm et al. | |
| 7,864,168 B2 | 1/2011 | French | |
| 7,917,169 B1 | 3/2011 | Hall | |
| 7,969,914 B1 | 6/2011 | Gerber et al. | |
| 7,970,749 B2 | 6/2011 | Uhlir et al. | |
| 8,085,813 B2 | 12/2011 | Melick et al. | |
| 8,128,405 B2* | 3/2012 | Preston et al. | 434/11 |
| 8,248,367 B1 | 8/2012 | Barney et al. | |
| 8,332,544 B1 | 12/2012 | Ralls et al. | |
| 8,341,271 B2 | 12/2012 | Cho et al. | |
| 8,359,643 B2 | 1/2013 | Low et al. | |
| 8,376,857 B1* | 2/2013 | Shuman et al. | 463/42 |
| 8,483,652 B2 | 7/2013 | Hall | |
| 2002/0141454 A1 | 10/2002 | Muniere | |
| 2002/0155846 A1 | 10/2002 | Shiraga | |
| 2002/0163912 A1 | 11/2002 | Carlson | |
| 2002/0167960 A1 | 11/2002 | Garcia-Luna-Aceves | |
| 2003/0074413 A1 | 4/2003 | Nielsen et al. | |
| 2003/0193394 A1 | 10/2003 | Lamb | |
| 2003/0235158 A1 | 12/2003 | Lee et al. | |
| 2004/0185881 A1 | 9/2004 | Lee et al. | |
| 2004/0213270 A1 | 10/2004 | Su et al. | |
| 2005/0058151 A1 | 3/2005 | Yeh | |
| 2005/0096065 A1 | 5/2005 | Fleischman | |
| 2005/0152318 A1 | 7/2005 | Elbatt et al. | |
| 2005/0152378 A1 | 7/2005 | Bango et al. | |
| 2005/0254453 A1 | 11/2005 | Barneah | |
| 2005/0259597 A1 | 11/2005 | Benedetto | |
| 2006/0013154 A1 | 1/2006 | Choi et al. | |
| 2006/0023677 A1 | 2/2006 | Labrador | |
| 2006/0084444 A1 | 4/2006 | Kossi et al. | |
| 2006/0126535 A1 | 6/2006 | Sherman | |
| 2006/0128349 A1 | 6/2006 | Yoon | |
| 2006/0148516 A1 | 7/2006 | Reddy et al. | |
| 2006/0153157 A1 | 7/2006 | Roh et al. | |
| 2006/0227787 A1 | 10/2006 | Furlong et al. | |
| 2007/0008925 A1 | 1/2007 | Dravida et al. | |
| 2007/0019594 A1 | 1/2007 | Perumal et al. | |
| 2007/0110092 A1 | 5/2007 | Kangude et al. | |
| 2007/0180533 A1 | 8/2007 | Ramaiah et al. | |
| 2007/0198731 A1 | 8/2007 | Li et al. | |
| 2007/0217346 A1 | 9/2007 | Zheng et al. | |
| 2007/0259716 A1 | 11/2007 | Mattice et al. | |
| 2007/0259717 A1 | 11/2007 | Mattice et al. | |
| 2007/0263571 A1 | 11/2007 | Hermann et al. | |
| 2007/0265088 A1 | 11/2007 | Nakada et al. | |
| 2007/0265089 A1 | 11/2007 | Robarts et al. | |
| 2007/0266396 A1 | 11/2007 | Estermann | |
| 2007/0287437 A1 | 12/2007 | Cartmell | |
| 2008/0015024 A1 | 1/2008 | Mullen | |
| 2008/0039113 A1 | 2/2008 | Liu et al. | |
| 2008/0058099 A1 | 3/2008 | Schwartz et al. | |
| 2008/0080401 A1 | 4/2008 | Ribiere et al. | |
| 2008/0144493 A1 | 6/2008 | Yeh | |
| 2008/0159236 A1 | 7/2008 | Ch'ng | |
| 2008/0163355 A1 | 7/2008 | Chu | |
| 2008/0186206 A1 | 8/2008 | Reumerman | |
| 2008/0192737 A1 | 8/2008 | Miyazaki et al. | |
| 2008/0262928 A1 | 10/2008 | Michaelis | |
| 2009/0017913 A1 | 1/2009 | Bell et al. | |
| 2009/0030605 A1 | 1/2009 | Breed | |
| 2009/0041039 A1 | 2/2009 | Bear et al. | |
| 2009/0045977 A1 | 2/2009 | Bai et al. | |
| 2009/0046628 A1 | 2/2009 | Hall | |
| 2009/0138353 A1 | 5/2009 | Mendelson | |
| 2009/0175223 A1 | 7/2009 | Hall | |
| 2009/0201860 A1 | 8/2009 | Sherman et al. | |
| 2009/0207783 A1 | 8/2009 | Choi et al. | |
| 2009/0245518 A1 | 10/2009 | Bae et al. | |
| 2009/0248420 A1 | 10/2009 | Basir | |
| 2009/0298461 A1 | 12/2009 | O'Reilly | |
| 2009/0323579 A1 | 12/2009 | Bai et al. | |
| 2009/0325603 A1 | 12/2009 | Van Os et al. | |
| 2010/0008259 A1 | 1/2010 | Yoon et al. | |
| 2010/0029245 A1 | 2/2010 | Wood et al. | |
| 2010/0042601 A1 | 2/2010 | Kelley et al. | |
| 2010/0060480 A1 | 3/2010 | Bai et al. | |
| 2010/0064307 A1 | 3/2010 | Malhotra et al. | |
| 2010/0067451 A1 | 3/2010 | Hall | |
| 2010/0069109 A1 | 3/2010 | Hall | |
| 2010/0074234 A1 | 3/2010 | Banks et al. | |
| 2010/0082513 A1 | 4/2010 | Liu | |
| 2010/0150129 A1 | 6/2010 | Jin et al. | |
| 2010/0162149 A1* | 6/2010 | Sheleheda et al. | 715/764 |
| 2010/0169009 A1 | 7/2010 | Breed et al. | |
| 2010/0214987 A1 | 8/2010 | Mori | |
| 2010/0215040 A1 | 8/2010 | Kappler et al. | |
| 2010/0226342 A1 | 9/2010 | Colling et al. | |
| 2010/0245124 A1 | 9/2010 | Bai et al. | |
| 2010/0248618 A1 | 9/2010 | Bai et al. | |
| 2010/0248843 A1 | 9/2010 | Karsten | |
| 2010/0250106 A1 | 9/2010 | Bai et al. | |
| 2010/0250346 A1 | 9/2010 | Bai et al. | |
| 2010/0279776 A1 | 11/2010 | Hall | |
| 2010/0287011 A1* | 11/2010 | Muchkaev | 705/7 |
| 2010/0304759 A1 | 12/2010 | Leppanen et al. | |
| 2010/0329463 A1 | 12/2010 | Ratliff et al. | |
| 2011/0081973 A1 | 4/2011 | Hall | |
| 2011/0103302 A1 | 5/2011 | Hall | |
| 2011/0105151 A1 | 5/2011 | Hall | |
| 2011/0177829 A1 | 7/2011 | Platt et al. | |
| 2011/0230202 A1 | 9/2011 | Wood et al. | |
| 2011/0244887 A1 | 10/2011 | Dupray et al. | |
| 2012/0058814 A1 | 3/2012 | Lutnick et al. | |
| 2012/0079080 A1 | 3/2012 | Pishevar | |
| 2012/0094770 A1 | 4/2012 | Hall | |

OTHER PUBLICATIONS

Bjerver, Martin, "Player Behaviour in Pervasive Games—using the City as a Game Board in Botfighters", Master of Science Thesis, KTH Computer Science and Communication, Stockholm, Sweden, 2006.* bzflag(6)—linux man p., Google date Feb. 1, 2001, downloaded from http://linux.die.net/man/6/bzflag.* de Souza e Silva, Adriana, "Alien revolt (2005-2007): A case study of the first location-based mobile game in Brazil", IEEE Technology and Society Magazine, Spring 2008, pp. 18-28.*

Dialogic, "Adding location based services to existing architectures", Application Note: Location-Based Services, 9862-02, Oct. 2007, 14 pages, downloaded from http://www.dialogic.com/~/media/products/docs/signaling-and-ss7-components/9862_Add_Locationbased_Servs_an.pdf.*

Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.*

Halas, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.*

Hohfeld, Alexander, "In and out of reality: Janus-faced location awareness in ubiquitous games", Journal of Software, vol. 2 No. 6, Dec. 2007, pp. 86-92.*

Kim, Seong-Whan et al., "Kalman filter based dead reckoning algorithm for minimizing network traffic between mobile nodes in wireless GRID", Embedded and Ubiquitous Computing, Lecture Notes in Computer Science, vol. 4096, 2006, pp. 162-170.*

Lindo, Wayne A. et al., "Network modeling and simulation in the OneTESS program", Fall Simulation Interoperability Workshop 2006, Orlando, Florida, USA, Sep. 10-15, 2006, pp. 155ff.*

(56) References Cited

OTHER PUBLICATIONS

MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.*

Santos, Nuno et al., "Vector-field consistency for ad-hoc gaming", Middleware 2007, LNCS 4834, 2007, pp. 80-100.*

Sotamaa, Olli, "All the world's a Botfighter Stage: Notes on location-based multi-user gaming", Proceedings of Computer Games and Digital Cultures Conference, Tampere University Press, 2002, pp. 35-44.*

U.S. Appl. No. 13/683,025, filed Nov. 21, 2012, Panta.
U.S. Appl. No. 13/712,353, filed Dec. 12, 2012, Hall.
U.S. Appl. No. 13/327,472, filed Dec. 15, 2011, Hall.
U.S. Appl. No. 13/333,084, filed Dec. 21, 2011, Hall.
U.S. Appl. No. 13/875,735, filed May 2, 2013, Hall.
U.S. Appl. No. 13/890,423, filed May 9, 2012, Hall.

Nicklas, Daniela, and Bernhard Mitschang. "On building location aware applications using an open platform based on the NEXUS Augmented World Model." Software and Systems Modeling 3.4 (2004): 303-313.

Nintendo, The computer game "Mario Kart DS", released in North America on Nov. 14, 2005, published by Nintendo, as evidenced by the game FAQ by Alex, downloaded from http://db.gamefaqs.com/portable/ds/file/mario$_{13}$ kart$_{13}$ ds$_{13}$ h.txt, with a game FAQ reported upload date of Jul. 15, 2007, p. 11.

Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.

Winkler, Additional date evidence for the Ars Electronica organization archive document http://archive.aec.at/submission/2004/U19/1043/, retrieved from http://web.archive.org/web/20050508084628/http://www.aec.at/en/archives/prix$_{13}$ archive/prix$_{13}$ projectasp?iProjectID=12899, (dated 2005).

Various Authors, The Wikipedia page for the "snake" computer game, Nov. 3, 2008 version, Wikipedia.com, downloaded by the USPTO from http://en.wikipedia.org/w/index.php?title=Snake$_{13}$ (video$_{13}$ game)&oldid=249370716 on Oct. 4, 2012.

U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
U.S. Appl. No. 13/169,829, filed Jun. 27, 2011, Hall.
U.S. Appl. No. 13/277,895, filed Oct. 20, 2011, Hall.

Hall et al., "A Two-Level Quality of Service Scheme for Collision Based Mobile Ad Hoc Networks", IEEE, 1-4244-1513-06/07, 2007, 8 pages.

Hall, "RTEQ: Modeling and Validating Infinite-State Hard-Real-Time Systems", AT&T Labs Research, ASE 2007, Nov. 2007, 4 pages.

Ko et al., "Flooding-Based Geocasting Protocols for Mobile Ad Hoc Networks, Mobile Networkers and Applications", Dec. 2002, 7, 471-480.

Ko et al., "Geocasting in Mobile As Hoc Networks:Location-Based Multicast Algorithms", Technical Report TR-98-018 Texas A & M University, Sep. 1998, 10 pages.

Liao et al., "GRID: A Fully Location-Aware Routing Protocol for Mobile Ad Hoc Networks", Telecommunication Systems, 2001, 18, 1-26.

Ilyas, "Body Personal, and Local Ad Hoc Wireless Networks", Chapter 1, CRC Press, 2003, 22 pages.

Shih et al., "A Collision Avoidance Power Control MAC Protocol for Wireless Ad Hoc Networks", IEEE Communications Letters, Sep. 2005, 9(9), 859-861.

Shih et al., "A Distributed Slots Reservation Protocol for QoS Routing on TDMA-based Mobile Ad Hoc Networks", Networks 2004, (ICON 2004), Proceedings 12$^{th}$ IEEE International Conference, Nov. 2004, 2, 660-664.

Tseng et al., "Fully Power-Aware and Location-Aware Protocols for Wireless Multi-hop Ad Hoc Networks", Proc. of IEEE Intl. Conference on Computer Communications and Networks (ICCCN), 2002, 6 pages.

Hall, "Cheating Attacks and Resistance Techniques in Geogame Design," Proc. 2010 ACM FuturePlay Symposium, 2010, 82-89.

Hall, "An Improved Geocast for Mobile Ad Hoc Networking," IEEE Transactions on Mobile Computing, 2010, 1-14.

Corbett, et al. "A Partitioned Power and Location Aware MAC Protocol for Mobile Ad Hoc Networks," Technical Report No. 553, University of Sydney, School of Information Technologies, Jul. 2004, 7 pages.

Panta, "GeoV2V: Vehicular Communications Using a Scalable Ad Hoc Geocast Protocol," AT&T Labs Research, 14 pages.

Balasubramaniam, et al. "Interactive WiFi Connectivity for Moving Vehicles," Proceedings of SIGCOMM, Aug. 17-22, 2008, 12 pages.

Maihofer, "A Survey of Geocast Routing Protocols," IEEE Communications Surveys, Jun. 2004, 32-42.

Das, et al., "SPAWN: A Swarming Protocol for Vehicular Ad-Hoc Wireless Networks," Proceedings of 1$^{st}$ ACM Vanet, Oct. 2004, 2 pages.

German Aerospace Center, Simulation of Urban Mobility, 2010, http://sumo.sourceforge.net, 1 page.

Gupta, et al., "The Capacity of Wireless Networks," IEEE Transactions on Information Theory, 46(2), Mar. 2000, 17 pages.

Hadaller, et al., "Vehicular Opportunistic Communication Under the Microscope," Proceedings of MobiSys, Jun. 11-14, 2007, 206-219.

Heissenbüttel, et al., "BLR: Beacon-Less Routing Algorithm for Mobile Ad-Hoc Networks," Elsevier's Computer Communications Journal, 27, 2003, 15 pages.

Hall, et al., "A Tiered Geocast Protocol for Long Range Mobile Ad Hoc Networking," Proceedings of the 2006 IEEE Military Communications Conf., 2006, 8 pages.

Hull, et al., "CarTel: A Distributed Mobile Sensor Computing System," Proceedings of ACM SenSys, Nov. 2006, 14 pages.

Eriksson, et al., "Cabernet: Vehicular Content Delivery Using WiFi," Proceedings of Mobicom, Sep. 2008, 12 pages.

Karp, et al, "GPSR: Greedy Perimeter Stateless Routing for Wireless Networks," Proceedings of Mobicom, 2000, ACM 2000, 12 pages.

Kuhn, et al., "Geometric Ad-Hoc Routing: Of Theory and Practice," Proc. 2003 Symposium on Principles of Distributed Computing, ACM 2003, 10 pages.

Lee, et al., "CarTorrent: A Bit-Torrent System for Vehicular Ad-Hoc Networks," Mobile Networking for Vehicular Environments, Sep. 2007, 6 pages.

Lee, et al., "Efficient Geographic Routing in Multihop Wireless Networks," Proc. MobiHoc 2005, ACM, 2005, 12 pages.

Ni, et al., "The Broadcast Storm Problem in a Mobile Ad Hoc Network," Proceedings of the 5$^{th}$ Annual ACM/IEEE International Conference on Mobile Computing and Networking, ACM, 1999, 151-162.

Manvi, et al., "Performance Analysis of AODV, DSR, and Swarm Intelligence Routing Protocols in Vehicular Ad Hoc Network Environment," Proceedings of IEEE Future Computer and Communications, Apr. 2009,21-25.

Niculescu, et al., "Trajectory Based Forwarding and its Applications," Proc. Mobicom 2003, ACM, 2003, 13 pages.

Ns-2, "The Network Simulator," 2010, http://isi.edu/nsnam/ns, 2 pages.

Schwingenschlogl, "Geocast Enhancements of AODV for Vehicular Networks," ACM SIGMOBILE Mobile Computing and Communications Review, Jun. 2002, 18 pages.

Shevade, et al., "Enabling High-Bandwidth Vehicular Content Distribution," Proceedings of CoNEXT 2010, Nov. 30-Dec. 3, 2010, 12 pages.

Yassein, et al., "Performance Analysis of Adjusted Probabilistic Broadcasting in Mobile Ad Hoc Networks," Proc. 11$^{th}$ Intl. Conf. on Parallel and Distributed Systems Workshops, 2005, 27 pages.

(56) References Cited

OTHER PUBLICATIONS

Zahn, et al., "Feasibility of Content Dissemination Between Devices in Moving Vehicles," Proceedings of CoNEXT 2009, Dec. 1-4, 2009, 11 pages.

Zorzi, et al., "Geographic Random Forwarding (GeRaF) for Ad Hoc and Sensor Networks: Multihop Peformance," IEEE Transactions on Mobile Computing, Dec. 2003, 11 pages.

Social + Gaming—SWiK: http://swik.net/social+ gaming, (2010).

http://askville.amazon.com/Wii-games-play-Internet-Family/AnswerViewer.do?requestId=6796582(2007), (retrieved 2009).

Schutzberg, "Phone-based GPS-based Games: Missing Pieces"; http://www.directionsmag.com/articlephp?article_id=939 (Aug. 17, 2005).

"Boost Mobile introduces First Location-based, GPS games in US"http://www.physorg.com/news5824.html (Aug. 16, 2005).

"Sony bigwig hints at GPS-enabled PSP games"; http:www.vespacious.com/sony-bigwig-hints-at-gps-enabled-psp-games.html (Dec. 22, 2008).

Steve:"GPS-enabled Cell Phone Games" http://www.strangenewproducts.com/2005/08/gps-enabled-cell-phone-games.html (Aug. 15, 2005.

Location-Enabled Mobile Gaming; http://www.nn4d.com/site/global/market/affiliate_sites/Ibsglobe/Ibsapplications/mobilegaming.jsp (2007).

* cited by examiner

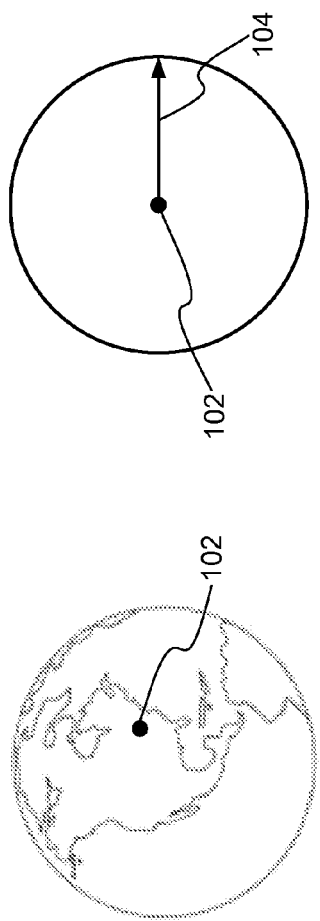
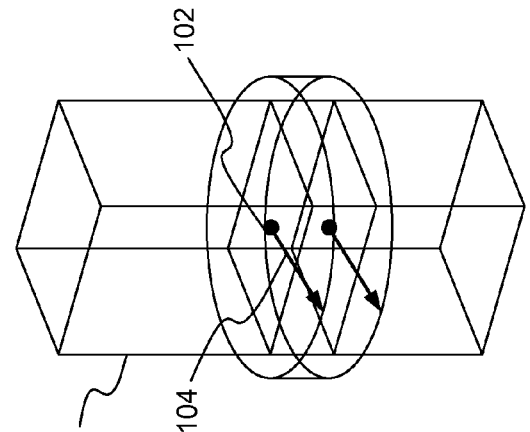
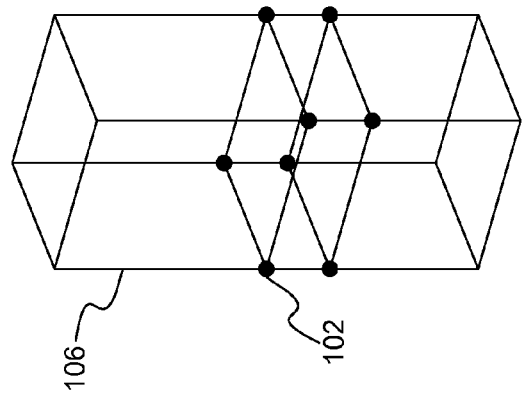

AUGMENTED REALITY GAMING VIA GEOGRAPHIC MESSAGING

CROSS REFERENCE TO RELATED APPLICATIONS

This application claims priority to U.S. provisional patent application No. 61/258,167, filed Nov. 4, 2009, which is incorporated herein by reference in its entirety.

BACKGROUND

Typically, players of video games involving physical activity and/or movement are forced to play those games within restricted environments. Such games are typically executed on gaming console machines (e.g., Nintendo's® Wii™) connected to home entertainment systems. Typically, players of such games interact with the games themselves via wired and/or wireless controllers. However, these controllers have a limited range, meaning that physical video games are most often played indoors within a limited range from the gaming console and/or home entertainment system. Game consoles typically must be positioned on a stable, flat surface, and require 110 volt connections to a power supply. These characteristics leave gaming consoles with little to no portability.

Multiplayer versions of video games involving physical movement typically allow multiple players to compete against one another. The players may be at one physical location, with simultaneous access to one gaming console. Alternatively, multiplayer gamers may link up over a network such as the Internet. Networked games are typically facilitated by wireline or wireless access provided to the gaming console. Despite the physical distance separating them, players engaged in a multiplayer game from different physical locations will still have limited movement due to the non-portable nature of their gaming console and/or the environment in which it is placed. Due to the complex routing techniques typically used by networked multiplayer games, those games typically rely on the constant presence of wireless and/or wireline network connectivity. If access to the network is interrupted for even very short periods of time, the multiplayer gaming experience can be deteriorated or lost altogether. Thus, it is sometimes not possible to enjoy multiplayer gaming involving physical movement at all, for example in a remote geographic area with limited or no network service available.

SUMMARY

Geographic gaming ("geogaming") via a scalable, wireless geographic broadcast ("geocast") protocol enables multiplayer gaming between mobile communication devices without relying on traditional network elements. No gaming console is required, eliminating the venue restrictions imposed by wired controllers and/or wireless controllers with limited ranges, meaning geogames can be played in wide open spaces, either indoors or outdoors. Geogaming can be fully distributed over an ad hoc network of mobile communications devices, eliminating the need for traditional mobile communications infrastructure and central servers. Because no network infrastructure is required to play, geogaming can take place in remote areas with little or no network access, for example in the middle of the woods. The scalable nature of the geocast protocol enables geogames to function equally well in both remote areas and crowded areas containing both geogame players and other users of mobile communications devices. Because multiplayer geogames do not require constant communication with a central server, game play can be more physically active and geographically wide ranging. Geogaming using tiered geocasting enables geogame players to participate in multiplayer gaming spanning great distances. For example, players on separate continents may participate in a single multiplayer geogame.

Geocast regions corresponding to real-world geographic space can be defined and used as game play elements in wireless geogaming. For example, a geocast region may define the boundaries of a virtual playing field, a virtual court, or the like within which geogaming players can play. Geocast regions may also be used to define game elements, for example a virtual ball in a geogaming version of catch. A geocast region may also be defined for a simulated area of effect of a game element, for example the radius of effect of a virtual mortar shell or a virtual nuclear strike in a military simulation game. In another example a geocast region may be defined as the detection area of a virtual unmanned aerial vehicle (UAV), which may provide reconnaissance information on the location of other players of a geogame. Geocast regions defining game elements may be dynamically varied during gameplay, for example in location, size, position, etc. These and other features of geogaming may be used in conjunction with physical activities that traditionally do not use mobile communications devices, for example, paintball, laser tag, and the like. Geogaming hardware and/or software may incorporate additional types of geocast messaging, such as geographic text messaging ("geotexting"), and/or geographic querying ("geogquerying").

BRIEF DESCRIPTION OF THE DRAWINGS

FIGS. 1A-1E depict example techniques that may be used for defining the shape and/or dimensions of geogaming regions and/or geogaming elements.

DETAILED DESCRIPTION OF ILLUSTRATIVE EMBODIMENTS

Figure 2:
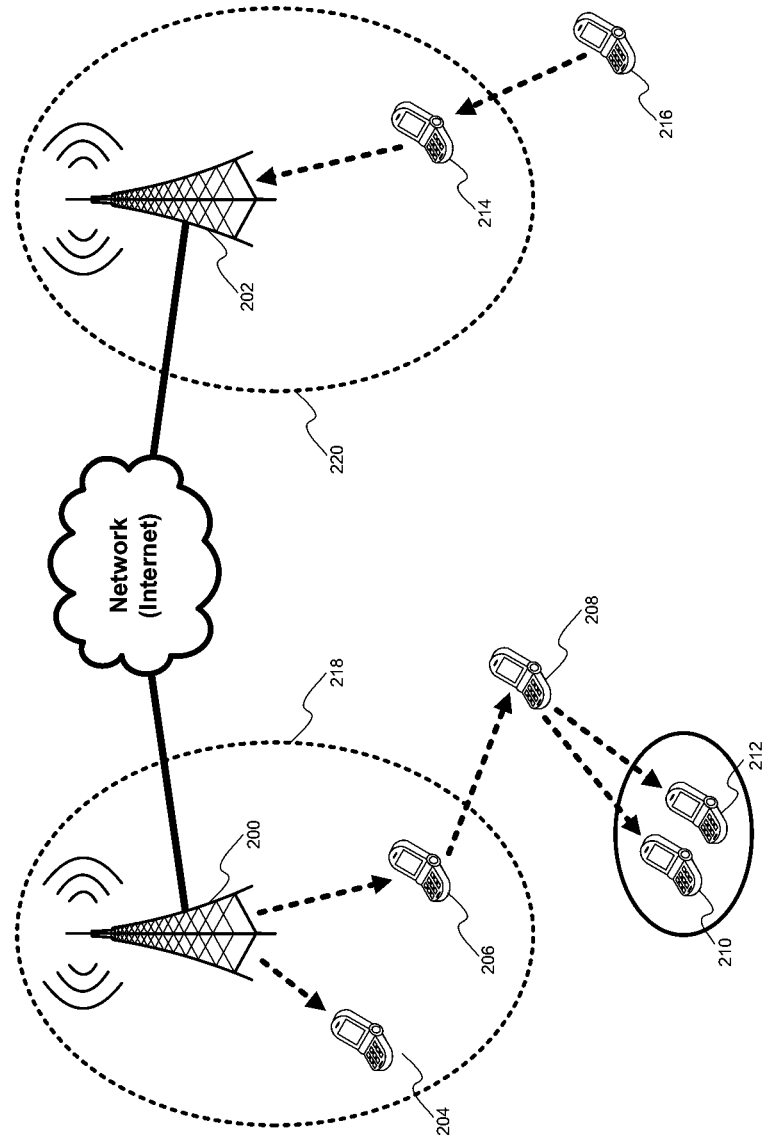
FIG. 2 illustrates communication in an ad hoc network via WiFi access points.

Wireless, scalable, multiplayer gaming is enabled between mobile communication devices via the use of geographic messages exchanged via a wireless geographic broadcast ("geocast") protocol. Gaming via wireless geographic broadcasts ("geogaming") allows communications devices participating in the game to communicate without the use of a traditional centralized server or routing tables and state information. Traditional wireline and wireless network infrastructure devices are not required. Geocast protocol features may be used to implement dynamic game elements within multiplayer geogames, for example projectiles, balls, reconnaissance vehicles, and the like. The scalable nature of geogames using a geocast protocol allows multiplayer games to be established and played in dense or crowded areas (e.g., a park in a large city), where multiple users of mobile communications devices, some players and some non-players, may simultaneously congregate.

In the embodiments described herein, geographical broadcasting (referred to as "geocasting") may be utilized to enable multiplayer gaming between mobile communications devices in distinct geographic areas. Geocasting is described in U.S. Pat. No. 7,525,933, entitled "System And Method For Mobile Ad Hoc Network," filed Nov. 30, 2005, issued Apr. 28, 2009, which is incorporated by reference herein in its entirety. Geocasting uses a protocol in which an IP address is replaced with a geographic address. Generally, geogaming packets are sent to every mobile communications device located within a specific geocast region. A geocast region generally corresponds to a specific geographic area. Each geogaming packet may contain an indication of a destination geocast region (i.e., geogaming region) for the geogaming packet, an indication of the geographic location of the source of geogaming message, and additional information such as information pertaining to a game element and/or a target geocast region associated with such an element. Mobile communication devices participating in geocast messaging may be referred to collectively as a geocast ad hoc network. No registration is required for a mobile communications device to join a geocast ad hoc network. As mobile communications devices move within communications range of members of a geocast ad hoc network, they can automatically participate in the geocast ad hoc network. The mobile communication devices of an ad hoc network communicate with each other, and each mobile communications device in the ad hoc network is capable of receiving and/or transmitting geogaming message packets to and/or from other communications devices in the ad hoc network of mobile communications devices. Ad hoc networks of mobile communication devices do not require base station terminals or other network components to facilitate or control communications between the mobile communications devices. However, in some embodiments, base stations and/or other network components may be used to relay and/or bridge geocast messages between geocast ad hoc networks or between geocast ad hoc networks and a traditional network, for example the Internet.

A mobile communications device that receives geocast packets may redistribute the geocast packets to other mobile communications devices according to heuristic decision rules that determine whether a receiving communications device will re-transmit a received packet. These rules effectively guide geocast packets to their destinations and control communication traffic within the ad hoc network. The decision rules achieve this control by using statistics obtained and recorded by the communications device as it receives packets transmitted within its reception range. This distributed packet transfer mechanism results in geocast packets "flowing" to and throughout the geocast region specified in each geocast packet. The communications devices in the geocast region receive and process each distinct geocast packet, and may render the content of the geocast packet to the user via a user interface of the communications device. Two geocast packets are distinct if they contain distinct geocast identifiers. However, a re-transmitted copy of a packet generally will contain the same geocast identifier as the original packet.

In an example embodiment applying heuristic decision rules, a receiving communications device may determine whether to retransmit a geocast message packet based upon the number of times the geocast message was previously received, the communication device's proximity with respect to the communications devices from which the message was sent, and/or the communication device's proximity to the geocast region. This decision process may be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. In a first step of the location-based approach, the receiving communications device determines whether it has previously received the same geocast message at least a predetermined number (N) of times. If not, it retransmits the message over the ad hoc network of communications devices. If so, the communications device progresses to the second step and determines whether the sending communications device is closer than some minimum distance away. If no prior sender of the geocast message was closer than the minimum distance away, the communications device retransmits the geocast message to the ad hoc network of communications devices. Otherwise, the communications device progresses to the third step and determines whether it is closer to the center of the geocast region than any sending communications device from which the geocast message was received. If so, the communications device transmits the geocast message over the ad hoc network of communications devices. If not, the communications device does not retransmit the geocast message.

This location-based approach prevents a receiving communications device from retransmitting a geocast message that was most likely already retransmitted by another communications device located close to it (and thus most likely reaching the same neighboring communications devices that it can reach). In addition, this location-based approach reduces the chance that the communications device will retransmit the same geocast message multiple times to the same neighboring communications devices.

While transmission and propagation of geogaming messages are described herein with reference to embodiments using a particular scalable wireless geocast protocol, the scope of the instant disclosure should not be limited thereto. It is to be understood that the methods and apparatuses for distributing geogaming messages as described herein may be implemented in conjunction with other geographic broadcast protocols, and that the use of such other geographic broadcast protocols is meant to be included within the scope of the instant disclosure.

FIGS. 1A-1E depict example techniques for defining geocast regions. A geocast region may be defined to be a single point 102, as depicted in FIG. 1A. A point geocast region may be defined by a longitude value and a latitude value (not shown). A point above the surface of the earth could be defined by providing an altitude value in addition to longitude and latitude values. A geocast region may also be comprised of multiple single points (not shown) such as the single point 102. Location points such as point 102 may be used as the building blocks for more complex geocast region geometries, as described herein. FIG. 1B depicts a geocast region defined by a point 102 in combination with a radius 104. The geocast region of this example will comprise the area enclosed by the radius, and may include the space above the area as well. A geocast region could also be defined as the overlap region between two or more circular geocast regions (not shown). FIG. 1C depicts a more complex geometry formed from a series of points 102 interconnected with straight boundary lines. This technique of geocast region definition is similar to the techniques typically used in the definition of parcels of real property. FIGS. 1D and 1E depict the creation of one or more geocast regions within a single geographic footprint. FIG. 1D depicts creating a geocast region for a specific floor of a building 106. The single floor geocast region is defined as the volume of space between upper and lower areas, each formed using a series of points 102 set at corners of the buildings. FIG. 1E depicts an alternate technique for defining a single floor geocast region in building 106. Upper and lower points 102 are defined in the middle of the ceiling and the floor of the geocast region respectively. The single floor geocast region is then defined as the volume of space between an upper area and a lower area defined by a pair of radii 104 extending from the middle points. Geocast regions may also be defined to change in size, geographic location, etc. with time (not shown), essentially allowing the creation of geocast geogaming regions in four dimensions. For example a geogaming region corresponding to a virtual playing field may be defined to change size, shape, and/or geographic location over time as the number of participating geogame players fluctuates. Information defining a particular geocast region (e.g., a series of points) can be communicated in an addressing portion of a geogaming message. Geocast sub-regions may be defined within a particular geocast region using the above techniques. It should be noted that the techniques described with reference to FIGS. 1A-1E are merely examples, and the scope of the instant disclosure should not be limited thereto. Other geogaming region geometries and techniques for defining geogaming regions may be recognized by those skilled in the art, and are meant to be included within the scope of the instant disclosure.

FIG. 2 illustrates communication in an ad hoc network of communications devices via WiFi access points 200 and 202. Communications devices in a geocast ad hoc network can communicate via RF signals encoded with geographic information, via Bluetooth® technology, via WiFi (e.g., in accordance with the 802.11 standard), or the like, or any combination thereof. For example, as depicted in FIG. 2, mobile communications devices 204, 206, 208, 210, and 212 form one geocast ad hoc network and mobile communications devices 214 and 216 form another geocast ad hoc network. Coverage area 218, which is the area covered by the WiFi access point 200, covers the mobile communication devices 204 and 206. Coverage area 220, which is the area covered by the WiFi access point 202, covers the mobile communication device 214. As shown in FIG. 2, the mobile communications device 216 transmits to the mobile communications device 214 directly (e.g., via Bluetooth®). The mobile communications device 214 retransmits to the WiFi access point 202, which in turn retransmits to the WiFi access point 200 over a network, for example the Internet. The mobile communications devices 204 and 206 receive the transmission from the WiFi access point 200, and the mobile communications device 206 retransmits directly to the mobile communications device 208. And, as depicted, the mobile communications device 208 retransmits to the mobile communications devices 210 and 212.

Figure 3:
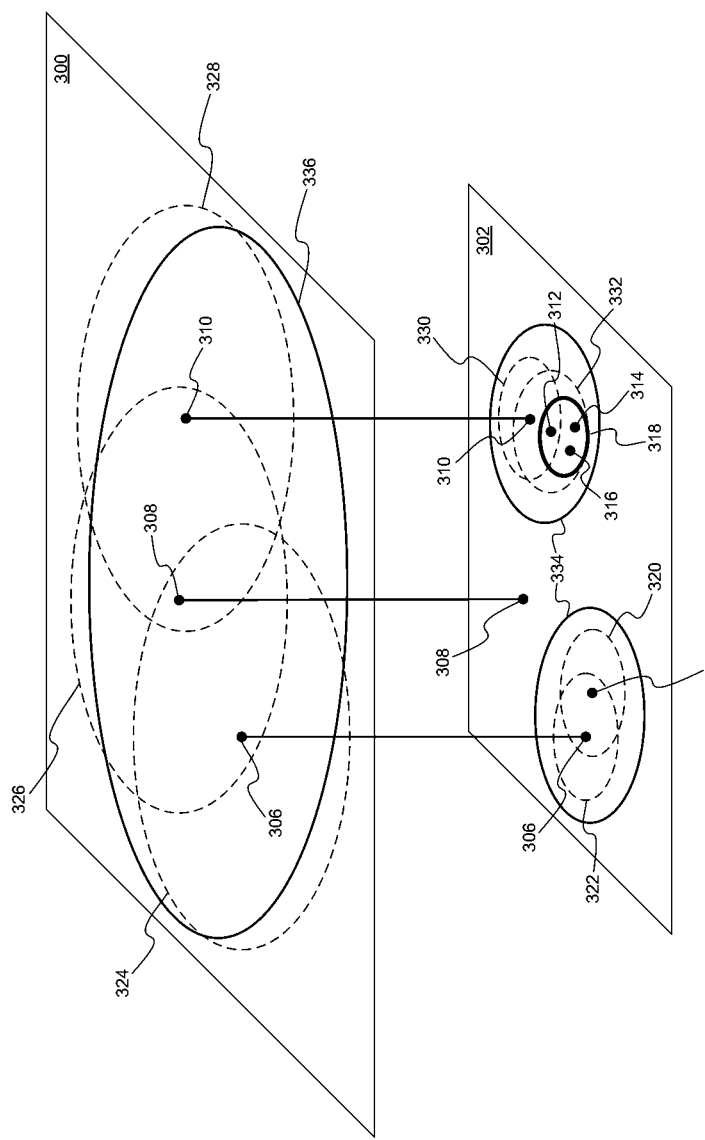
FIG. 3 illustrates tiered geocasting and forwarding zones.

FIG. 3 illustrates tiered geocasting and forwarding zones. Tiered geocasting extends the reach of ad hoc communication networks through the use of long range transmitters (such as communications devices, etc.), infrastructure, a communications network, a cellular tower, or a combination thereof, when available. Tiered geocasting may enable multiplayer geogaming between mobile communications devices separated by distances beyond the broadcast range of typical mobile communications devices. For example, using tiered geocasting, geogame players in different cities, states, or even continents can participate in geogames with each other. Tiered geocasting assumes that at least one communications device within an ad hoc network is capable of communicating via a long range tier 300. A long range tier is a term indicating a tier wherein characteristic message transfers between devices occur over a longer physical range than those over some other tier, such as a short range tier 302. A long range tier can be wireless, wired, or a combination thereof.

A forwarding zone can be utilized to implement tiered geocasting. A common forwarding zone can be defined for all geocast packets or different forwarding zones can be defined for different types of geocast packets. Forwarding zones (as depicted in FIG. 3 by short and long range forwarding zones 334 and 336 respectively, for example and without limitation) can be defined differently in different tiers for a single packet type, or even on a packet by packet basis. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) 304, 306, 308, 310, 312, 314, and 316, are at various locations within the short range tier 302 and the long range tier 300. All of communications devices 304, 306, 308, 310, 312, 314, and 316 together form a geocast ad hoc network. The communications devices 312, 314, and 316 are located in geocast region 318. In an example embodiment, the communications device 304 may transmit a geocast message with a destination address of the geocast region 318. Each of the communications devices 304, 306, 308, 310, 312, 314, and 316 can determine its own geographic location through any type of location determination system including, for example, the global positioning system (GPS), assisted GPS (A-GPS), time difference of arrival calculations, configured constant location (in the case of non-moving nodes), any combination thereof, or any other appropriate means. Each communications device is operable to transmit and receive geocast packets via the geocast ad hoc network. In addition, at any given time, some subset (possibly all) of the communications devices may be operable to transmit and receive geocast packets over the long range tier 300 network. For example, though not a limitation, in FIG. 3, the communications devices 306, 308, and 310 can transmit and receive geocast messages over both the short range tier 302 and the long range tier 300. Note that this latter fact is indicated visually in the diagram by the communications devices 306, 308, and 310 each being represented by two nodes (one in the short range tier and one in the long range tier) connected by a vertical line. The long-range tier 300 network can be any network in which packets can be transmitted from one long range capable communications device to another long range capable communications device. Such packet networks can include, for example, an infrastructure-based network comprising wireless base stations (for up- and down-link) operating on a separate frequency from that used by the ad hoc network. In addition, the long rang tier network also could be implemented simply as another instance of an ad hoc communications network using distinct radio frequencies and possibly longer radio ranges.

The communications device 304 transmits, within its communication range 320, a geocast message addressed to the geocast region 318, and the communications device 306, located within the communications range 320 of the communications device 304, receives the transmission. The communications device 306 may retransmit the message, within its communications range 322 on the short range tier 302, in accordance with the heuristics for the short range forwarding zone 334. The communications device 306, with long range transmission capability (in the long range tier 300), may simultaneously retransmit the message within its communication range 324 on the long range tier 300. The communications device 308, configured for long range communications only and located within the communications range 324 of the communications device 306, receives the transmission from the communications device 306 and may retransmit the message within its communication range 326 on the long range tier 300. The communications device 310, located within the communication range 326 of the communications device 308, receives the transmission from the communications device 308 and may retransmit the message in both its communication range 328 on the long range tier and its communication range 330 on the short range tier. The communications device 312, a member of the geocast region 318 and located within the communication range 330 of the communications device 310, receives the transmission from the communications device 310 and may retransmit the message within its communication range 332 on the short range tier, thus transmitting the geocast message to the communications devices 314 and 316, the other members of geocast region 318, thereby completing the geocast message transmission.

Figure 4:
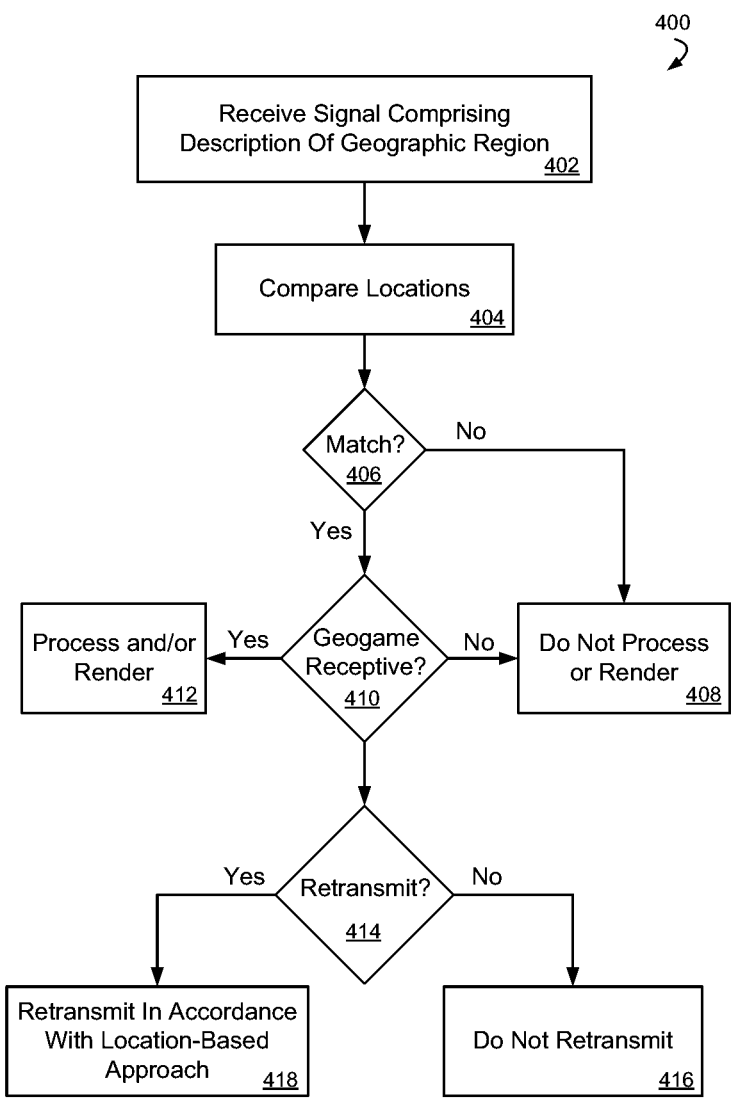
FIG. 4 is a flow diagram of an example process for propagating geogaming messages, or the like, via geocasting.

FIG. 4 is a flow diagram 400 of an example process for propagating geogaming messages, or the like, via geocasting. A signal is received at step 402. The signal comprises a description of the geographic region of intended reception of the signal, and may contain information pertaining to a geogame, a geogame element, or the like. The signal can be received by any appropriate communications device, such as a mobile communications device, for example. At step 404, the current location of the communication device is compared with the location of the geographic region of intended reception. It is determined, at step 406 if the locations match. That is, it is determined if the location of the receiving communications device is the same as, within, or overlaps, the location of the geographic region of intended reception. If the locations do not match, content of the message is not processed or rendered at step 408. If the locations match, it is determined at step 410 if the receiving communications device is receptive to geogaming messages. For example, the receiving communications device may be an active participant in a geogaming session to which the signal pertains. In another example, the receiving communications device might be configured to accept or deny invitation messages to geogaming sessions, or may alternatively be configured to discard all geogaming signals received. These and other configuration settings of the receiving communications device may be set via default within the firmware and/or software of the receiving communications device. In another embodiment, these configuration settings may be stored in a profile of a user of the communications device and may be alterable by the user. If the receiving communications device is determined to not be receptive to geogaming messages at step 410, content of the message is not processed or rendered at step 408. If the receiving communications device is determined to be receptive to geogaming messages at step 410, appropriate content (e.g., target location information and/or geogame element characteristics) of the message may be processed and/or rendered, at step 412, via the receiving communications device. At step 414, it is determined if the message is to be retransmitted by the receiving communications device. If, at step 414, it is determined that the message is not to be retransmitted, the message is not retransmitted at step 416. If, at step 414, it is determined that the message is to be retransmitted, the message is retransmitted at step 418, if appropriate, in accordance with the above-discussed location-based approach.

Specialized types of geocast messages may be employed during the course of setup and/or gameplay of a geogame. A first type of specialized geocast packet is a geographic text messaging ("geotext") message. Geotext messages may be used to inform potential and/or existing geogame players of information pertaining to a geogame. A geotext message packet may contain a number of portions, such as destination and sending address portions, and one or more content portions. A destination address portion typically defines a geocast region within which the geotext should be propagated. The geocast region for a geoquery message may be defined using the above-discussed techniques for defining geocast regions. The geocast region may correspond to the physical boundaries of a geogame, such that all players within those boundaries will receive the message. The geocast region may also be larger or smaller than the geogame boundaries, depending upon the purpose of the message. For example, a geocast region encompassing an entire city might be defined in order to notify all mobile communications devices located within the city of an upcoming geogame. In another example, a small geocast region might be defined within the geocast region corresponding to the geogame boundaries in order to communicate an in-game message between teams of players in an ongoing geogame. A sending address portion may provide an indication of a location of the mobile communications device that transmitted the geotext message and/or an indication of the user who transmitted the message. The substance of a geotext message is typically contained within the content portion. In an embodiment, geotext messaging content may be transmitted in many forms, for example text, audio, video, pictures, graphics, images, multimedia, and the like. For example, after a scoring event occurs in a geogame, the content portion of a geotext informing of the scoring event might comprise: text identifying the scoring player and/or scored-upon player; a map indicating where the scoring event took place; an audio indicator of the scoring event; or the like. A scoring event geotext may be transmitted to a particular geogame player, to members of a geogame team, to all geogame players, or any combination thereof. The content of geotext messages might also include links, for example hyperlinks or other electronic pointers directing a receiving communications device to other files or media stored locally or remotely from the receiving communications device, online information, online downloads, a server providing real-time geogame information or statistics, and the like. In another embodiment, the content of geotext messages may be limited, for example to a series of text characters and/or a maximum message length.

The content portion of a geocast messaging packet may also contain data used in executing and/or mediating a geogame. Because geogames are fully distributed among the communications devices participating in the game, aspects related to the multiplayer features, elements, and/or functions of a multiplayer geogame must be communicated between participating communications devices using aspects of a geocast protocol. In an embodiment, data pertaining to the execution and/or mediation of a multiplayer geogame are encapsulated within the content portions of geocast messages. In other words, the content portion of a geocast message may contain information used to set up a geogame, specify rules for the geogame, convey geogame events that occur during play of the game, and other information essential to the execution and/or mediation of the geogame. Message content of this type may consist of strings of alphanumeric characters, sections of binary code, sections of machine language, and the like, or any combination thereof.

Geocast messages, such as geotext messages, can be directed (i.e., addressed) to designated sets of communications devices and/or individual communications devices within a geocast region. In an embodiment, this may be achieved by designating recipients for a geocast message in the content portion of the geocast message when it is transmitted. A filtering logic in the geocast message processing of receiving communications devices can filter out geocast messages that are designated for communications devices other than the receiving communications device. The receiving communications device can then cease processing on such a message, retransmit it in accordance with forwarding heuristics if appropriate, or discard it. When a geocast message is composed, recipients may be designated in the content portion of the geocast message. Recipients may be designated in groups, for example a geocast message might be addressed to all employees of a given company within a geocast region. Such a message would be processed by all mobile communications devices in the destination geocast region that belong to the designated company, and would be filtered out and either retransmitted or discarded by receiving communications devices that do not belong to the designated company. Alternatively, the content portion of a geocast message may designate individual communications devices for receipt of a geocast message by using an identifier such as a communications device identifier, a user name, or the like. Geocast messages may also be addressed or any combination thereof. When a geocast message addressed to specific participants in a geocast region is received at a receiving communications device, a filtering logic on the receiving communications device may perform additional processing and/or testing on the content portion of the received geocast messaging packet (e.g., a geotext message) in order to determine whether the receiving communications device has been designated as an addressee of the geocast message. If the geocast message passes the filtering process, the content portion may be rendered on the receiving communications device. If the geocast message is not addressed to the receiving communications device and thus is filtered out, processing of the geocast message may be halted, and the message may be retransmitted in accordance with forwarding heuristics, or may be discarded.

Another specialized type of geocast message, namely a geographic query ("geoquery") message, enables additional functionality in geogaming applications. A geoquery message functions to query all mobile communications devices within a specific geocast region that are configured to communicate via geocast messaging. A unique feature of geoquery messages is that they may specify whether a geoquery response message from a receiving mobile communications device is mandatory or voluntary. A geoquery packet may contain a number of portions, such as destination and sending address portions, and a query content portion. A destination address portion typically defines a geocast region within which the geoquery message should be propagated. The geocast region for a geoquery message may be defined using the above-discussed techniques for defining geocast regions. In an embodiment, a geoquery geocast region may correspond to the physical boundaries of a geogame, such that all players within those boundaries will receive the geoquery message. The geocast region may also be larger or smaller than the geogame boundaries, depending upon the purpose of the message. For example, a geocast region encompassing an entire city might be defined in order to recruit users of mobile communications devices located within the city for a geogaming session. In another example, a smaller geocast region might be defined within the geocast region corresponding to the geogame boundaries in order to identify geogame players that may have been "hit" by a geogame element, such as a virtual artillery strike. A sending address portion may provide an indication of a location of the mobile communications device that first transmitted the geoquery message (i.e., the device from which the message originated). The sending address portion may also act as a return destination address for geoquery response message packets transmitted by receiving communications devices in response to the geoquery message. The query content portion contains the substance of the query and may also contain an indicator of whether a geoquery response message by a receiving communications device is mandatory or voluntary. In an embodiment, if a geoquery response message is mandatory, the receiving communications device may transmit a geoquery response message automatically regardless of interaction from a user of the receiving communications device. Alternatively, a user of the receiving communications device may be presented with an opportunity to compose content for inclusion in the mandatory geoquery response message before it is transmitted.

In an embodiment, a geoquery message with a voluntary geoquery response indicator may be used to recruit players (i.e., invite participation) for a pending or in-progress geogame. The query content of such a geoquery message may contain information pertaining to a geogaming session, such as the type of geogame, the location of a virtual playing field, a time when the geogame will be played, the number of geogame players currently participating, and the like. A receiving mobile communications device may render the geogaming information on the receiving device and query a user of the receiving device for an acceptance or refusal of the invitation to play. In another embodiment, a geoquery message with a mandatory geoquery response indicator may be used to collect device-related information from a receiving communications device. A geoquery message may require that a receiving communications device report usage statistics, such as how many geocast packets it has transmitted, received, and/or forwarded within a designated timeframe, configuration settings that have been inputted to the receiving communications device by a user, and the like. In an example use of such an embodiment, a mandatory response to a geoquery message may be used to collect configuration settings, contact info, and the like from a user's communications device for the purpose of creating a backup copy of that information. In yet another embodiment, a geoquery message with a mandatory geoquery response indicator may be used to ensure gameplay continuity and/or mitigate cheating in the geogame. For example, in a geogame artillery simulation, a geoquery message may be transmitted to a "target" geocast region when a virtual artillery shell "hits" that geocast region. Any mobile communications devices participating in the geogame must respond with an indication that they are in the geocast region of the hit. Geoquery messages of this type may be used to record and/or verify scoring events within a geogame. In an embodiment, if a receiving communications device refuses or otherwise fails to respond to with a mandatory geoquery response message, the user associated with that mobile communications device may be penalized, disqualified, and/or removed from the geogame entirely.

When a multiplayer geogame is initiated or is in progress, multiple geogaming regions may be created and/or managed by mobile communications devices participating in the geogame. Separate geogaming regions may be defined using any one of the above-discussed techniques or a combination thereof. A geogaming region can be defined in communications among members of an ad hoc geocast network within a geogaming region. For example, information describing a geogaming region (e.g., location, size, shape, coordinates, range of coordinates, etc.) can be contained in packets communicated among the members of the ad hoc network. The information could vary from packet to packet, vary as a function of time (e.g., the boundaries of the geogaming region may be redefined as the geogame progresses or changes with time), and/or predetermined and fixed prior to communications between members of the ad hoc network. Geogaming regions may be defined manually, for example as agreed upon by the participants of a multiplayer geogame at a time of inception of the game. Alternatively, geogaming regions may be predefined and/or defined automatically by geogame hardware and/or software. A combination of player-defined and hardware and/or software-defined geogaming regions may also be used. Geogaming regions may be redefined or otherwise modified when appropriate. Geogaming region modifications may be implemented manually by geogame players, auto-generated by the geogaming hardware and/or software, or may be defined using a combination of techniques. For example, a geogaming region encompassing a virtual playing field may be resized as the number of players who are still "alive" fluctuates.

Geogaming regions may correspond to real-world geographic locations. Boundaries of a geogaming region may be defined to correspond with real-world boundaries. For example, points corresponding to longitude and latitude may be used to define the geographic area of a city park as a geogaming region. An altitude component may be added to define a volume as a geogaming region. Defining a geogaming region corresponding to the boundaries of a public park may transform the park, from the perspective of communication devices participating in the geogame, into a virtual playing field for the geogame. If the boundaries of a geogaming region are fixed to create such a virtual playing field, penalties may be imposed on players for straying outside of the boundaries. Alternately, the boundaries of a geogaming region may be modifiable as the geogame progresses. In such an embodiment, a default virtual playing field may be defined at the outset of a geogame, and modified accordingly during the course of gameplay, for example if more players are joined to the geogame, if a certain stage in gameplay is reached, or if players initiate a vote to redefine gameplay boundaries.

Geographic sub regions may be defined within geogaming regions. For example, it may advantageous to define a broad geogaming region in which to transmit query messages recruiting potential players to a geogame. A sub region comprising a virtual playing field might then be defined within the geoquery region based upon the location of interested players, the number of interested players, and the like. A broad geogaming region may also be useful if multiple geogaming playing fields are defined within a geographic area. Distinct geogaming sub regions may also be defined within a particular geogaming virtual playing field, for example to define geogaming regions with unique gameplay features, as discussed in more detail below.

Geogaming regions and/or sub regions may be used to define game elements. A game element may be representative of an object existing within the geogame. Game elements may have varying characteristics controlling how they react with other elements and geogame players within the context of the geogame. Example characteristics of game elements may include whether a particular element is static or dynamic, passive or interactive with other game elements and/or geogame players, whether they are placed into the geogame in response to a command of the geogame software or in response to a request by a geogame player, whether the game element is ephemeral or persistent throughout the duration of a geogame session, and how the game element is triggered within the context of the geogame. Game element characteristics may be defined within portions of geogaming messages, as discussed in more detail below. Game elements may be added or removed from a geogame based on the actions of geogame players. In an embodiment, a geogaming element may be triggered by a geogame player, causing the triggered geogame element to be placed into the geogame. The effect on gameplay of the game element may hinge upon a level of interaction with the element by other game elements or geogame players. Once placed in the geogame, game elements may be activated within the geogame in a number of ways. For example, a game element may self-activate after a prescribed amount of time has passed. In other embodiments, a game element may remain dormant until activated in accordance with a level of interaction between the game element and other game elements and/or geogame players. For example, a game element defined within a particular geographic sub region of a virtual playing field may activate once a communications device associated with a geogame player enters the geographic area corresponding to the geographic sub region. In an embodiment comprising an artillery simulation geogame, examples of game elements activated in accordance with player proximity may include virtual ammunition dumps that refill a geogame player's game ammunition when the sub region is entered, bunkers or other safe areas where players would be immune from virtual attacks upon entry into the region, or healing areas where a player's virtual health within the geogame would be restored upon entry into the region.

The characteristics and/or behavior of game elements within a geogame may be defined and/or controlled via the exchange of geogaming message packets between mobile communications devices participating in an ad hoc network within the corresponding geogaming region. Geogaming message packets corresponding to game elements may contain a number of portions, such as destination and sending address portions, an element characteristic portion, and a target portion indicating a desired target or area of affect of the game element. A destination address portion typically defines a geographic region within which the geogaming message should be propagated. The geographic region may correspond to the physical boundaries of a geogame, such that all players within those boundaries will receive the message. A sending address portion may provide an indication of a location of the mobile communications device that transmitted the element-related geogaming message. An element characteristic portion may contain information pertaining to virtual physical characteristics of the game element that control how the game element will interact with other elements or geogame players, for example, size, speed, weight, ability to inflict damage, effective radius in the virtual playing field, and the like. A target portion may be defined to indicate a geographic location within the geogame playing field where the effect of the game element is desired to be implemented. A geogaming packet may also contain a flag or other type of indicator informing that the packet is intended to be processed and/or rendered only by devices participating in the respective geogame. The presence of the indicator may allow non-participating communications devices within the geogaming region to identify geogaming packets before processing them, and to retransmit them if appropriate. It is to be understood that the presence of the indicator is merely exemplary, and should not be interpreted as limiting or controlling with regard to the identification of geogaming packets by receiving communications devices.

Figure 5:
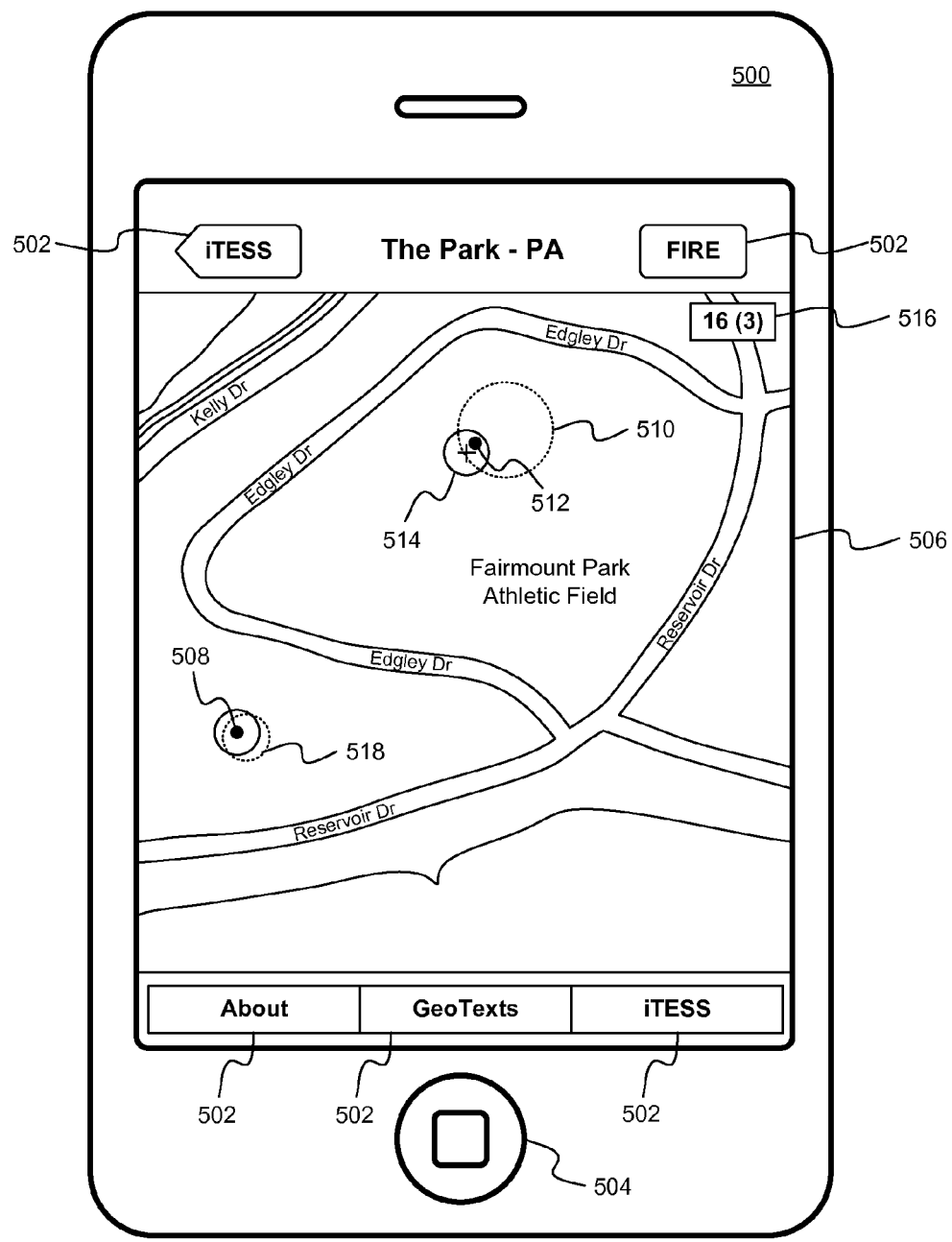
FIG. 5 depicts an example of implementing geogaming elements within a multiplayer artillery simulation on a mobile communications device.

FIG. 5 depicts an example embodiment of an artillery simulation geogame using the disclosed systems and methods of multiplayer gaming via geographic messaging. Mobile communications device 500 is configured for wireless, scalable, multiplayer gaming using geographic messages exchanged via a wireless geographic broadcast ("geocast") protocol. Features and/or functions of the artillery geogame may be controlled via control features of mobile communications device 500, including software buttons 502, hardware buttons 504, a touch-sensitive display 506, audible commands, physical translation and/or rotation of the communications device 500 about a set of x, y, and z axes, or any combination thereof. A displayed representation of a geographic region corresponding to a virtual playing field may be rendered on the display 506. The geographic region may correspond to a real-world geographic location. The representation may comprise a street map, a relief map, a satellite image, a photograph, a 3D environment, a video feed, or any combination thereof. The playing field representation may be overlaid with one or more additional representations, for example a player location 508 indicating a position of communications device 500 on the virtual playing field. The representations on display 506 may be updated in real-time to reflect changes to the geographic region representing the playing field and/or virtual or real-world location changes of geogame game elements and/or geogame players corresponding to the overlaid representations.

In an artillery simulation embodiment, one or more players exchange rounds of virtual artillery in an attempt to destroy one another. Players may be invited to join the artillery simulation geogame using techniques described elsewhere herein. The number of players able to join a single geogame is scalable, and therefore not limited. Players may play in an "every man for himself" mode, or may choose to form teams. A representation of the virtual battlefield (i.e., playing field) on which the geogame players engage each other may be rendered on a display 506 of a first player's communication device 500. The virtual battlefield may correspond to a real-world location where the geogame players are currently located. The location of communications device 500, and thus the first player, may be rendered on display 506 via player indication 508. Player indication 508 may be updated dynamically as the first player physically moves around on the virtual battlefield. The location of the communications device 500, and thus the first player, may be determined by any of the location techniques employed by mobile communications devices and described elsewhere herein.

In an example exchange of virtual artillery fire, the first player may identify the location of a second geogame player who is a foe of the first player. In an embodiment, the first player may discover the location of the foe player through the use of a virtual reconnaissance geogaming element. The initiation and operation of a virtual reconnaissance element are described in more detail below. The reconnaissance element may be commanded by the first player to conduct a virtual scan of a scanning area 510 designated by the first player. The virtual scan may reveal the location of the foe player. An enemy indicator 512 indication of the location of the foe player may be rendered on the display 506. The first player may choose to fire one or more virtual artillery rounds at the foe player. To initiate the firing of artillery, the first player may cause an aiming reticle 514 to be initiated and rendered on display 506. The aiming reticle may be initiated using any combination of the control features of communications device 500 described above. In an embodiment, the first player may initiate the aiming reticle by tapping a finger on a map of a virtual playing field displayed on the touch-sensitive display 506 of the communications device 500. The aiming reticle 514 may be rendered on the tapped location, thereby designating a target location for a particular artillery round. The virtual artillery round may be triggered (i.e., virtually fired) when the target location is designated via the aiming reticle 514. Alternatively, the virtual artillery round may be separately triggered by the first player after the target location has been designated and/or adjusted using the aiming reticle 514.

Alternative techniques for aiming a virtual artillery round may also be used. For example, in another embodiment, a target location may be designated for a virtual artillery round by pointing the communications device 500 at a particular angle and/or in a particular direction. An accelerometer within the communications device 500 may interpret the angle and/or direction that the communications device is pointed in and translate the information into a target location. In yet another embodiment, the first player may specify a target location by entering an azimuth and elevation textually, or by using a built in compass feature of the communications device 500. Once the target location has been designated, the target location may then be rendered on the display 506 via the aiming reticle 514, and the virtual artillery round may be triggered using one of the above-discussed techniques, or the like. It should be noted that the techniques for aiming a virtual element disclosed herein are merely examples, and the scope of the instant disclosure should not be limited thereto. Information depicting the current amount of virtual artillery ammunition possessed by the first player may be rendered on the display 506 via an ammo indicator 516. Ammo indicator 516 indicates that the first player currently has sixteen artillery rounds available, and that the first player is currently capable of triggering three artillery rounds at one time.

When the first player has triggered a virtual artillery round to be virtually fired towards a designated target location, communications device 500 may compose a geographic gaming message comprising a geogaming packet identifying a new geogaming element corresponding to the triggered artillery round for transmission to other geogame players participating in the artillery simulation. The geogaming packet may contain several portions, for example a destination address portion, a sending address portion, an element information portion, and a target location portion. A destination addressing portion may identify a geographic region corresponding to the virtual battlefield, so that other geogame players located in the real-world geographic location corresponding to the virtual battlefield and participating in the artillery simulation should receive the geogaming packet. The sending address portion may indicate a geographic location of communications device 500 at the time the geogaming packet was originally transmitted.

An element information portion may contain characteristics of the triggered virtual artillery shell, such as its virtual flight time to a target location, its virtual damage effect area, its virtual physical characteristics, etc. For example, one characteristic of the virtual artillery shell may be a virtual flight time of the virtual shell between the location of communications device 500 when the shell was triggered, and the target location designated by the first player. The virtual flight time may be calculated by communications device 500 prior to transmitting the geogaming packet. The virtual flight time may be calculated by communications device 500 based on the distance between an geographic origin location and the geographic location corresponding to the target location, and using virtual element characteristics (e.g., size, weight, shape, and charge of the virtual shell) and/or real-world variables (temperature, humidity, wind speed, wind direction, the Coriolis effect, etc.). The geographic origin location may correspond to the geographic location of mobile communications device 500 at the time the virtual shell is triggered, or may correspond to another geographic location, for example a geographic location of a virtual artillery battery positioned on the virtual battlefield. The element characteristics and/or variables used in the calculation may be selected by the geogame software and/or firmware of communications device 500, may be specified by one or more geogame players participating in the artillery simulation, or any combination thereof.

A target location portion of a geogaming packet may contain a geographic region specified by the first player upon triggering a game element. The geographic region of the target location may be defined using the above-disclosed techniques. In an embodiment, the target location may be defined as an area enclosed by a radius extending from a crosshair defined in the center of aiming reticle 514. In an artillery simulation geogame, the target location of a virtual artillery shell may be equated with a damage effect area of the virtual artillery shell. The damage effect area may be rendered within aiming reticle 514 as a circular area enclosing a crosshair. In an embodiment, the geographic region corresponding to the target location may be defined as the area encompassing the damage effect area. In another embodiment, the geographic region corresponding to the target location may be defined as an area larger than, but still encompassing, the damage effect area. By defining geographic region corresponding to the target location to be larger than the damage effect area, communications devices participating in the artillery simulation that are not located within the damage effect area of the target location at the time the virtual shot is triggered, but may be nearby or moving towards it, may receive advanced warning and change course or otherwise avoid the damage effect area. When a virtual artillery shell impacts within the geogame, other geogame assets such as other geogame players or other game elements located within the geographic region corresponding to the target location may be allotted a degree of virtual damage in accordance with the damage effect area and/or other element characteristics of the virtual artillery shell.

Mobile communications device 500 may also receive geogaming packets indicative of game elements initiated by other geogame players. For example, a second player participating in the artillery simulation geogame may use a second mobile communications device (not shown) to trigger a virtual artillery shell at the first player with communications device 500. In accordance with the triggering by the second player, communications device 500 may receive a geogame packet with multiple portions comprising destination and sending address portions, an element information portion, and a target location portion. The destination address portion may correspond to the geographic region corresponding to a virtual battlefield the artillery simulation is being played on. The sending address portion may indicate a geographic location of the mobile communications device, associated with the second player, that was the origin of the geogaming packet. Information about the virtual artillery shell triggered by the second player, for example its virtual flight time to the target location, may be included in the target location information. The target location information may comprise a geographic region corresponding to a virtual area of effect of the virtual artillery shell.

Mobile communications device 500 may receive this geogaming packet. Mobile communications device 500 may determine that the geogaming packet is associated with the artillery simulation geogame that mobile communications device 500 is participating in. Mobile communications device 500 may therefore process the packet in accordingly, determining that the geogaming packet describes an incoming virtual artillery shell triggered by the second player and aimed at the target location. In processing the geogaming packet, mobile communications device 500 may render an incoming shell indicator 518, corresponding to the target location of the virtual shell triggered by the second player, on the display 506. Mobile communications device 500 may track and render indications of multiple game elements simultaneously. For example, incoming artillery shells originating from multiple geogame players may be rendered on display 506 at the same time.

The element information portion of the second geogaming packet may comprise a virtual flight time for the incoming virtual artillery shell. Alternatively, the virtual flight time of the incoming shell may be calculated by mobile communications device 500 based upon the element information portion of the packet. At the expiration of the virtual flight time, the virtual artillery shell will cause a virtual impact at the target location. If one or more geogame players are located within the geographic region corresponding to the target location at the expiration of the virtual flight time, one or more respective success scoring events may be recorded. A success scoring event may be indicative of a hit by the virtual artillery shell. Successful scoring events may have varying meaning or impact on gameplay, for example a successful scoring event may indicate a "hit" upon a geogame player, may indicate the infliction of a prescribed amount of virtual damage upon the geogame player and/or game elements, or may cause one or more geogame players to be eliminated from the geogame.

The incoming shell indicator 518 currently overlaps player indication 508, indicating that a success scoring event will be imposed upon the first player if he or she does not physically move beyond the range of incoming shell indicator 518 before an expiration of the virtual flight time of the virtual artillery shell. At the expiration of the virtual flight time of the incoming virtual artillery shell triggered by the second player, mobile communications device 500 may determine its current physical location and compare its location with the geographic region corresponding to the target location. At this point a scoring event, either a "success" scoring event or a "failure" scoring event, may be recorded. If the geographic location of mobile communications device 500 is the same as, within, or overlaps the target location, a success scoring event corresponding to a "hit" may be recorded. Alternately, if the first player has succeeded in moving beyond the geographic region corresponding to the target location, so that the geographic location of mobile communications device 500 is not the same as, within, or overlaps the target location, a failure scoring event corresponding to a "miss" may be recorded by mobile communications device 500. For example, a miss (i.e., failure) scoring event may be recorded against a geogame player who has triggered a virtual artillery shell if no other participating geogame players are located within the target location designated for the virtual shell when it lands.

In an embodiment, recording a geogame scoring event, for example the first player 508 being hit by a virtual artillery shell triggered by the second player, comprises a physical recordation pertaining to the scoring event within a mobile communications device, for example the mobile communications device 500 may store information pertaining to a scoring event in a memory area of the mobile communications device 500. In another embodiment, recording a scoring event may comprise a mobile communications device affecting a state change within geogame software and/or hardware on the mobile communications device. For example, in a geogame artillery simulation where several "hits" may be required to virtually disable or destroy a player. Each successive hit may result in a series of respective state changes within geogame software and/or hardware of the mobile communications device corresponding to the player who is being hit. It should be noted that although geogaming scoring mechanisms are discussed herein with reference to an artillery simulation embodiment, these scoring event mechanisms are also applicable to any other type of geogame. An indication of the scoring event may be rendered on display 506 (not shown). Mobile communications device 500 may also transmit a geogaming packet indicative of the scoring event. The packet may comprise multiple portions, such as destination and sending address portions, and a scoring event portion indicating information about the scoring event. The destination address portion may correspond to a geographic region comprising a virtual playing field. The sending address portion may comprise the geographic location of mobile communications device 500 at the time the scoring event packet is originally transmitted. The scoring event portion may contain details of the scoring event, for example the geographic location of mobile communications device 500 when the virtual flight time expired, whether the scoring event was a success or failure, etc. Geogame packets may be generated separately for each scoring event. Alternately, if multiple scoring events occurred simultaneously or within a relatively short timeframe, a single geogame packet may contain multiple scoring event portions, each detailing a particular scoring event, or may comprise separate scoring event portions related to each scoring event. Geogame scoring event packets may be formatted in accordance with geotexting as discussed previously.

Mobile communications devices participating in geogames may also proactively discover scoring events. For example, the mobile communications device associated with the second player may transmit a geographic query message ("geoquery") packet at the expiration of the virtual flight time of the virtual artillery shell triggered by the second player. The geoquery packet may comprise multiple portions, including destination and sending address portions, and/or a geogame identifier portion indicative of the packet's association with a geogame in progress. The destination address portion may define a geographic region corresponding to the target location designated for the virtual artillery shell. The sending address portion may indicate the geographic location of the second player's mobile communications device when the geoquery packet was originally sent. The geogame identifier portion may act as a flag for receiving mobile communications devices, indicating that the packet is associated with an artillery simulation geogame, and more particularly with a virtual artillery shell triggered by the second player. The identifier portion allows receiving mobile communications devices not participating in the respective geogame to disregard processing of the geoquery packet. Receiving mobile communications devices participating in the geogame may, upon receiving the geoquery packet, process the geoquery packet, determine their current location, compare it with the geographic region defined by the destination address portion, and if the destination address portion and the current location of the receiving mobile communications device overlap, transmit a geoquery response message packet.

A geoquery response message packet may comprise multiple portions, including a destination sending address defining a geographic region corresponding to a virtual playing field associated with the geogame, a sending address portion indicative of the geographic location of the receiving communications device at the time the geoquery message was received, and/or a geogame identifier portion similar to that of the geoquery packet. The geogame identifier portion may indicate that the geoquery response message is intended for processing by the mobile communications device that transmitted the original geoquery message packet. The mobile communications device associated with the second player may, upon receiving a geoquery response message, determine whether a scoring event associated with the geoquery response has already been recorded. If such a scoring event has already been recorded, the geoquery response packet may be ignored and/or discarded. If a scoring event associated with the geoquery response has yet to be recorded, a scoring event may be recorded by the second player's mobile communications device, and a geogame message packet associated with the scoring event may be transmitted.

Figure 6A:
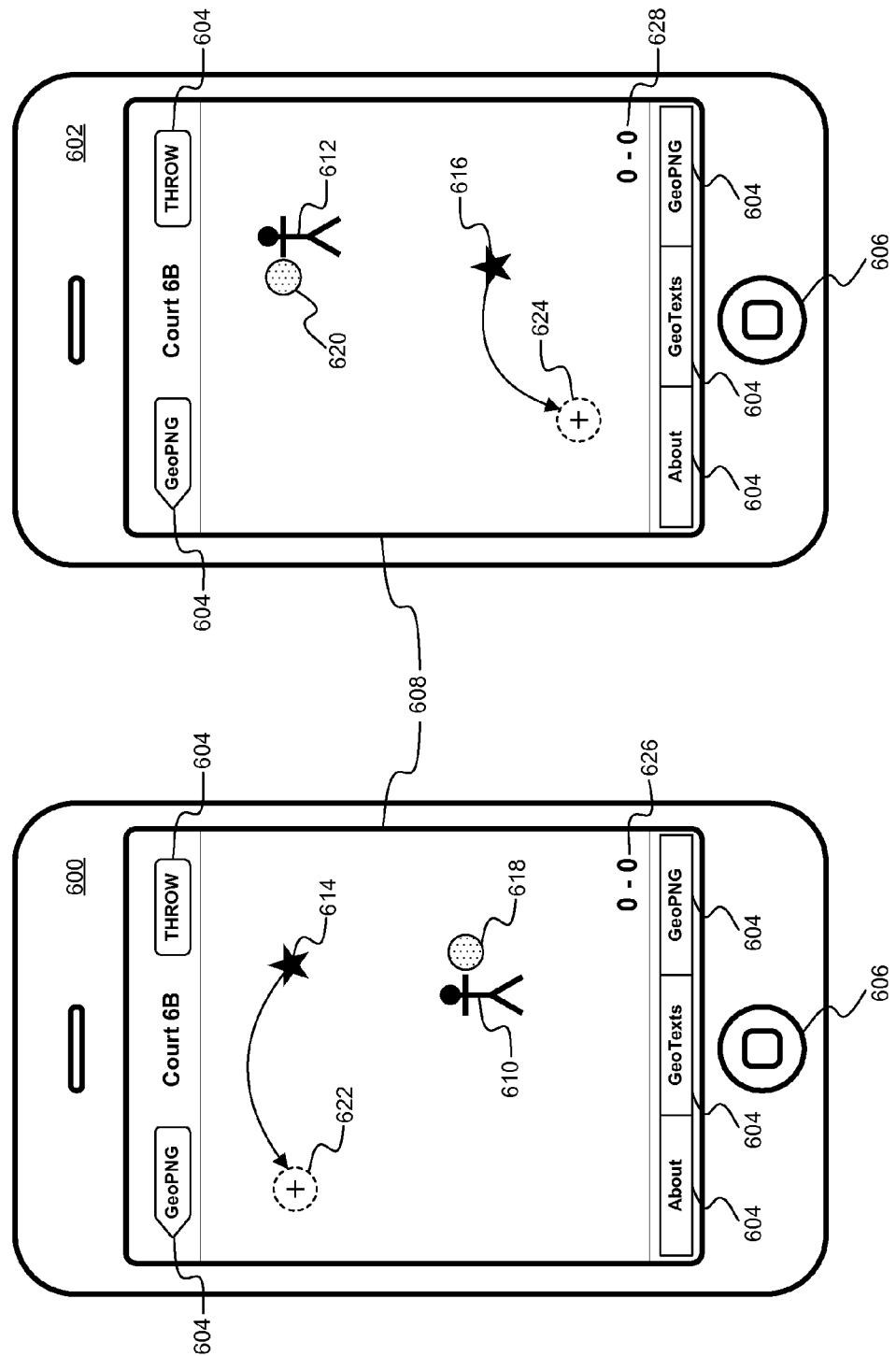
FIGS. 6A-6C depict an example of implementing geogaming elements within a multiplayer catch and throw simulation between two mobile communication devices.
Figure 6B:
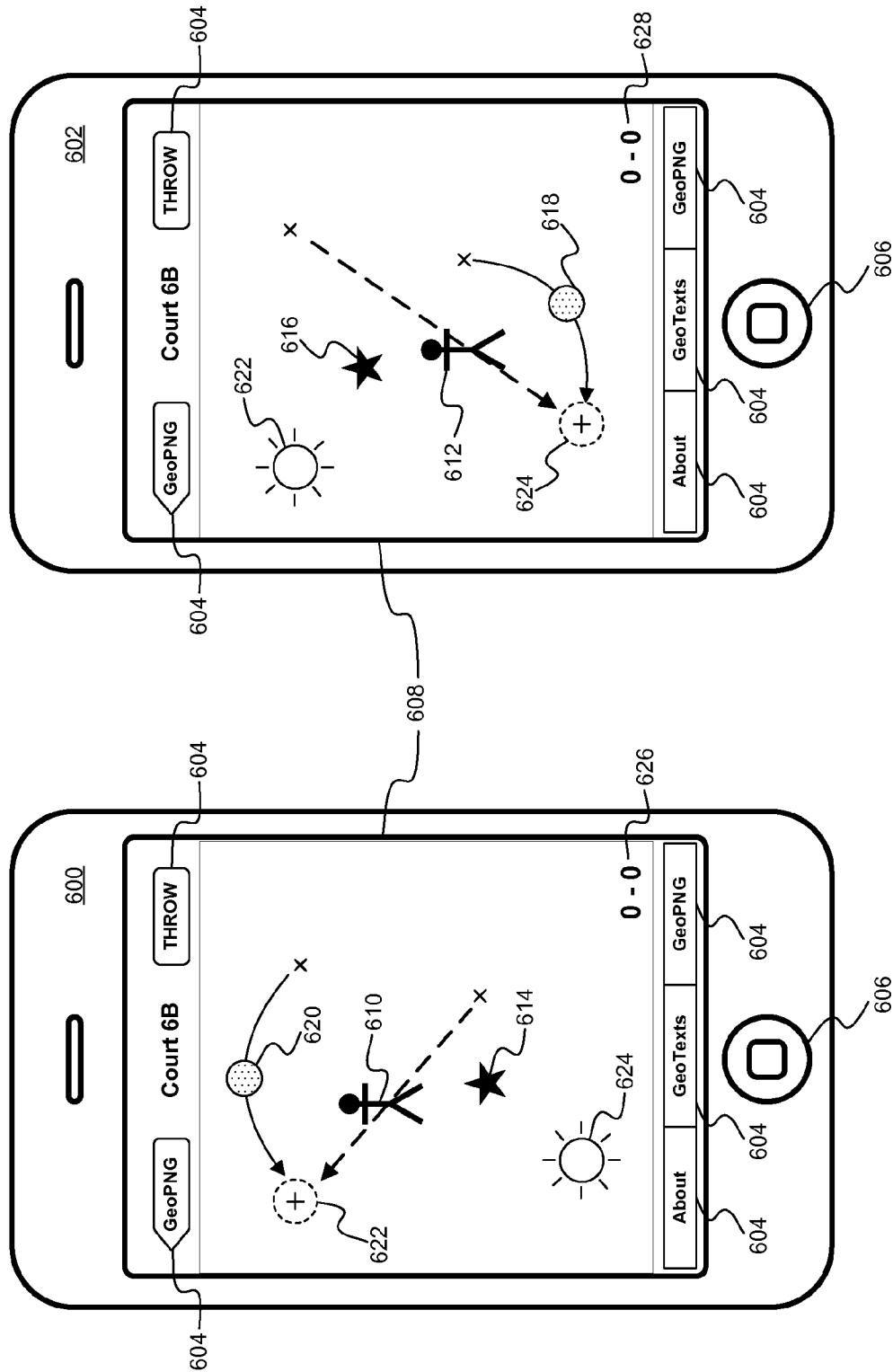
Figure 6C:
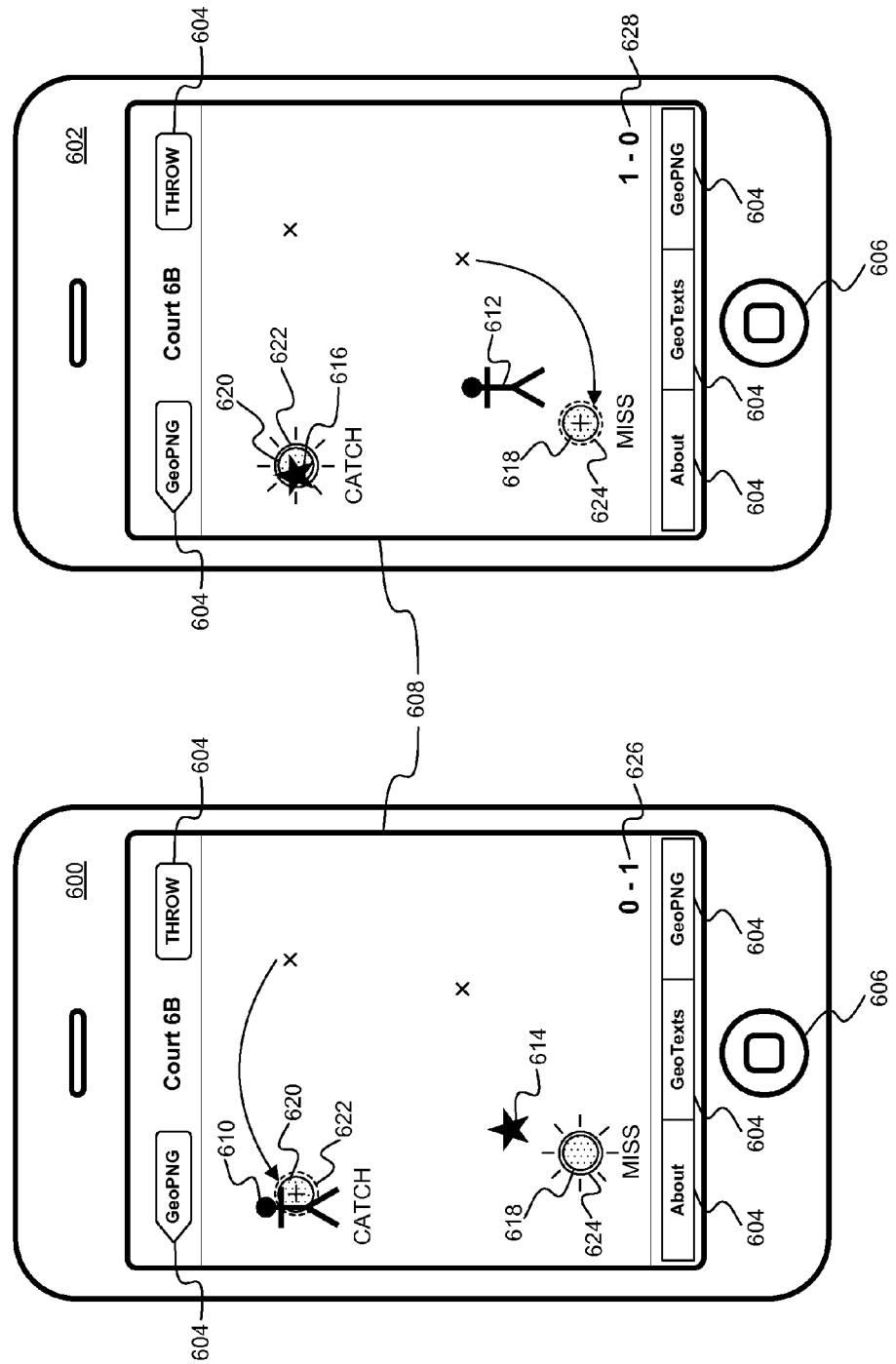

FIGS. 6A-6C depict an example embodiment of a catch and throw simulation geogame using the disclosed systems and methods of multiplayer gaming via geographic messaging. Mobile communications devices 600 and 602 are configured for wireless, scalable, multiplayer gaming using geographic messages exchanged via a wireless geographic broadcast ("geocast") protocol. Mobile communications devices 600 and/or 602 may control features and/or functions of the catch and throw geogame via control features of mobile communications devices 600 and/or 602, including software buttons 604, hardware buttons 606, a touch-sensitive display 608, audible commands, physical translation and/or rotation of the communications devices 600 and/or 602 about a set of x, y, and z axes, or any combination thereof. Each of the mobile communications devices 600 and 602 may display a rendered representation of a geographic region corresponding to a virtual playing field. The mobile communications devices 600 and 602 may be participating in the geogame on a common virtual playing field, or each device may be participating via its own distinct virtual playing field. The geographic regions may correspond to real-world geographic locations. The representations may comprise a street map, a relief map, a satellite image, a photograph, a 3D environment, a video feed, or any combination thereof. A representation of a virtual playing field may be overlaid with one or more additional representations, for example a respective player location 610 or 612, indicating positions of the mobile communications devices 600 and 602 on the respective virtual playing fields. The representations on displays 608 may be updated in real-time to reflect changes to the geographic regions representing the playing fields and/or virtual or real-world location changes of geogame game elements and/or geogame players corresponding to the overlaid representations.

In FIG. 6A, mobile communications devices 600 and 602 are participating in the catch and throw simulation, and are associated with a first player and a second player respectively. Although the present embodiments will be described with respect to two players, it should be noted that the catch and throw simulation geogame is scalable, and more than two players can participate in a single geogame. In an embodiment of the catch and throw simulation geogame, gameplay is of an "every man for himself" nature, and an objective is for each player to throw a virtual ball into an area of a playing field associated with an opposing player so that the opposing player can not "catch" the virtual ball. If the opposing player does not catch the virtual ball, the throwing player receives a point. In an embodiment, a catch and throw geogame may be played until a player scores a predetermined number of points. Other variations of the catch and throw simulation geogame, for example including teams of players working together, a geogame match comprising a series of individual rounds played to a predetermined score, with a victor determined by a number of rounds won within the match, are also possible. It should be noted that these embodiments are merely examples, and the scope of the instant disclosure should not be limited thereto.

Returning to the example of FIG. 6A, a first player is associated with mobile communications device 600, and a second player is associated with mobile communications device 602. A catch and throw simulation geogame can be formed and/or initiated using the techniques described above for the artillery simulation geogame. At the outset of a catch and throw geogame, a representation of a geographic region defined as a virtual playing field may be rendered on displays 608 of communications devices 600 and/or 602. The geographic region represented may correspond to an actual geographic location occupied by both the first and second players. In such an embodiment, the first and second players would both play the geogame within the boundaries of the virtual playing field. In another embodiment, the first and second player may be in separate geographic locations, with each player bound by a virtual playing field of approximately the same size. In yet another embodiment the geographic regions corresponding to the virtual playing fields may be different sizes for each player, for example as a means of handicapping one of the players.

The representation of the virtual playing field on each device may be overlaid with a rendering of an indication of the physical location of the opposing player within the virtual playing field. A player 2 indicator 610 may be rendered on the display of communications device 600, indicating the current physical location of the second player within the virtual playing field. Simultaneously, a player 1 indicator 612 may be rendered on the display of communications device 602, indicating the current physical location of the first player within the virtual playing field. An indication of a player's location within his or her respective playing field may be rendered as well. For example, location indicator 614 may indicate the first player's location within the playing field on mobile communications device 600, and location indicator 616 may indicate the second player's location within the playing field on mobile communications device 602. Geogame score indicators 626 and 628 may be displayed on mobile communications devices 600 and 602 respectively.

The location information pertaining to the first and second players may be discovered by the respective mobile communications devices using a number of techniques. In an embodiment, once all players have joined the geogame, each mobile communications device participating in the game may determine its current geographic location using the location techniques described elsewhere herein and communicate the location information using a geogaming packet. For example, at the outset of a catch and throw game between the first and second players, mobile communications device 600 may determine its current geographic location and communicate that information to mobile communications device 602 via a geocast packet. The packet may be comprised of multiple portions, including a destination address portion, a sending address portion, and a geogame indicator portion. The destination address portion may be defined in accordance with a geographic region associated with the second player earlier during geogame setup. The sending address portion may indicate the physical location of the first player within the virtual playing field, thereby enabling the rendering of player 1 indicator 612 on the display of mobile communications device 602. The geogame indicator portion may act as a flag for receiving mobile communications devices, indicating that the packet can be disregarded by mobile communications devices not participating in the respective geogame. If the first and second players are not sharing a common virtual playing field, the packet may also comprise a playing field portion defining the geographic region corresponding to the virtual playing field that the first player will be playing the geogame on. A similar geogame packet may be created and broadcast by mobile communications device 602, conveying the physical location of the second player to mobile communications device 600.

At the outset of a catch and throw game, match, or round, the player 1 indicator 612 and the player 2 indicator 610 are each rendered with an indicator of a virtual ball 620 and 618 respectively. The virtual ball may correspond to a dynamic game element. The game, match, or round begins when the first and/or second player initiates a virtual throw.

In an embodiment, the first player may initiate a virtual throw by causing an aiming reticle 622 to be initiated and rendered on the display of mobile communications device 600. The aiming reticle may be initiated using any combination of the control features of mobile communications device 600 described above. For example the location of the aiming reticle 622 may be designated by the first player tapping a corresponding area on a touch-sensitive display of the mobile communications device 600. The rendered aiming reticle 622 may be used by the first player to designate a target location for his or her virtual throw. Similarly, the second player may cause aiming reticle 624 to be initiated and rendered on the display of the mobile communications device 602. The designation of a target location for a virtual throw by the first player may automatically trigger the game element 620 corresponding to the first player's virtual ball to be thrown towards a geographic region corresponding to aiming reticle 622. Alternatively, a virtual throw may separately be triggered by the first player after the target location has been designated and/or adjusted via aiming reticle 622. Alternative techniques for aiming and/or initiating a virtual throw may also be used. For example, in another embodiment, the first player may flick the wrist of the hand holding the mobile communications device 600 to initiate a throw. An accelerometer within the mobile communications device 600 may measure interpret this movement and determine various aspects related to the first player's intended throw, such as the direction of the throw, the speed of the throw, the intended arc of the virtual ball, spin intended to be imparted to the virtual ball, and the like. The results of this interpretation may be used to define a target location for the virtual throw, which may be rendered on the mobile communications device 600 via the aiming reticle 622. It should be noted that the techniques for aiming a virtual element disclosed herein are merely examples, and the scope of the instant disclosure should not be limited thereto.

When the first and/or second player has triggered a virtual throw towards a designated target location, mobile communications devices 600 and/or 602 may each compose a geographic gaming message comprising a geogaming packet identifying the game element corresponding to the thrown virtual balls 618 and/or 620 respectively for transmission to other geogame players participating in the catch and throw simulation. The geogaming packets may each contain several portions, for example a destination address portion, a sending address portion, an element information portion, and a target location portion. In an embodiment, the destination addressing portion may define a geographic region corresponding to the respective virtual playing field. In an another embodiment, the geographic region may be defined to be larger than the virtual playing field. Defining the geographic region to be larger than the virtual playing field may ensure that a geogaming message will be received by communications devices that may not be within the boundaries of the playing field at the time when the geogaming message is transmitted, for example a geogame player who is not located within the boundaries of the geogame (e.g., is "out of bounds") or geogame spectators who may be observing the geogame from beyond the boundaries of the virtual playing field, either live or via their own mobile communications devices. The sending address portion may indicate a geographic location for each of mobile communications devices 600 and/or 602 at the time the geogaming packets were originally transmitted.

An element information portion may contain characteristics of the respective virtual balls 618 and 620, such as its virtual flight time to a respective target location, its virtual physical characteristics, etc. For example, one characteristic of a virtual ball may be a virtual flight time of the virtual ball between the location of a firing communications device when the virtual throw was triggered, and the target location designated by the respective player. The virtual flight time may be calculated by the triggering communications device prior to transmitting the geogaming packet. The virtual flight time may be calculated by the triggering communications device using other virtual element characteristics (e.g., size, weight, and shape, of the virtual ball) and/or real-world variables (temperature, humidity, wind speed, wind direction, the Coriolis effect, etc.). The element characteristics and/or variables used in the calculation may be selected by the geogame software and/or firmware of the respective mobile communications devices, may be specified by one or more geogame players participating in the catch and throw simulation, or any combination thereof.

A target location portion of a geogaming packet may contain a geographic region specified by a respective player upon triggering a game element. The geographic region of the target location may be defined using the above-disclosed techniques. In an embodiment, the target location may be defined as an area enclosed by a radius extending from a crosshair defined in the center of aiming reticles 622 and 624. In another embodiment, the target location may be defined by interpreting motion recorded by accelerometers within either of the mobile communication devices 600 and/or 602.

FIG. 6B depicts a state of the catch and throw geogame between the first and second players after each player has made a virtual throw. Mobile communications device 600 has received a geogaming packet indicative of the throw of virtual ball 618 by the second player. An indication of the target location 624 of virtual ball 618 may be rendered on the display of mobile communications device 600. The player 2 indicator 610 and location indicator 614 have been re-rendered on the display based on physical movements of players one and two on the respective virtual playing field. A representation of the virtual ball 620 on a flight path from the location of the throw by the first player to the target location 622 may also be rendered, along with a representation of the virtual ball 618 on a flight path (not shown) from the location of the throw by the second player to the target location 624. The various representations of the player 2 indicator 610, the location indicator 614, and the virtual balls 620 and/or 618 may be periodically re-rendered to reflect respective geographic position changes. The frequency of re-rendering the representations may be based on the receipt of additional geogame packets comprising updated location information, calculations of virtual flight times and/or virtual flight path trajectories, or a combination thereof. Mobile communications device 602 may render representations of player 1 indicator 612, location indicator 616, target location 624, virtual ball 618 and/or virtual ball 620, in a fashion similar to that of mobile communications device 600. Mobile communications devices 600 and 602 may track and/or render indications of multiple game elements associated with multiple geogame players simultaneously. For example, virtual balls thrown by multiple geogame players may be simultaneously rendered on the displays of mobile communications devices 600 and/or 602.

FIG. 6C depicts the end of the example catch and throw geogame round. The virtual flight times of virtual balls 618 and 620 have expired, and the virtual balls have arrived at their respective target locations 624 and 622. At the expiration of the flight time of virtual ball 618, mobile communications device 600 may determine its current geographic location and compare it to the target location 624 that virtual ball 618 was thrown to by the second player. Here the geographic location of mobile communications device 600 does not overlap target location 624, indicating that the first player has not succeeded in physically getting to the target location 624 of virtual ball 618 in order to "catch" the ball. Updated location information rendered on the display of mobile communications device 600 depicts that the virtual ball 618 thrown by the second player has arrived at the target location 624 before the first player, represented by location indicator 614, could reach the target location 624. Accordingly, a "miss" scoring event is recorded for the first player. At the expiration of the flight time of virtual ball 620, mobile communications device 602 may determine its current geographic location and compare it to the target location 622 that virtual ball 620 was thrown to by the first player. Here the geographic location of mobile communications device 602 overlaps and significantly corresponds to target location 622, indicating that the second player has succeeded in physically getting to the target location 622 of virtual ball 620 in order to "catch" the ball. Updated location information rendered on the display of mobile communications device 602 depicts that the second player, represented by location indicator 616, has arrived at the target location 622 before or coincidentally with the virtual ball 620 thrown by the first player. Accordingly, a "catch" scoring event is recorded for the second player.

A geogame scoring event, for example the first player missing virtual ball 618 and/or the second player catching virtual ball 620, may be recorded within the geogame by mobile communications devices 600 and/or 602. Indications of geogame scoring events may be rendered on the displays 608 of either mobile communications device 600 and/or 602.

Mobile communications devices 600 and/or 602 may also transmit geogaming packets indicative of scoring events. A geogaming scoring event packet may comprise multiple portions, such as destination and sending address portions, and a scoring event portion indicating information about the scoring event. In an embodiment, the destination addressing portion may define a geographic region corresponding to the respective virtual playing field. In an another embodiment, the geographic region may be defined to be larger than the virtual playing field. Defining the geographic region to be larger than the virtual playing field may ensure that a geogaming scoring event message will be received by communications devices that may not be within the boundaries of the playing field at the time when the scoring message is transmitted, for example a geogame player who is not located within the boundaries of the geogame (e.g., is "out of bounds") or geogame spectators who may be observing the geogame from beyond the boundaries of the virtual playing field, either live or via their own mobile communications devices. The sending address portion may comprise the geographic location of the sending mobile communications device at the time the scoring event packet is originally transmitted. The scoring event portion may contain details of the scoring event, for example the mobile communications device 602 may indicate its geographic location with respect to target location 622 at the expiration of the virtual flight time of virtual ball 620. Similarly, mobile communications device 600 may indicate its geographic location with respect to target location 624 at the expiration of the virtual flight time of virtual ball 618. Geogame scoring event packets may be generated separately for each scoring event. Alternately, if multiple scoring events occur simultaneously or within a relatively short timeframe, a single geogame packet may contain multiple scoring event portions, each detailing a particular scoring event, or may comprise separate scoring event portions related to each scoring event. Geogame scoring event packets may be formatted in accordance with geotexting as discussed previously. Indications of geogame scoring events may be rendered on the displays of mobile communications device 600 and/or 602. For example, mobile communications device 600 may render scoring indicator 626 to display "0-1," reflecting that the first player has not yet scored a catch and that the second player has scored one catch. Similarly, mobile communications device 602 may render scoring indicator 628 to display "1-0," reflecting that the second player has scored one catch and that the first player has not yet scored a catch.

Mobile communications devices 600 and 602 may independently verify scoring events using similar techniques to those discussed with reference to FIG. 5. For example, at the expiration of the flight time of virtual ball 620, the mobile communications device 600 may transmit a geographic query packet ("geoquery"). A geographic query response packet from mobile communications device 602 may verify its location at the expiration of the flight time of virtual ball 620. Mobile communications device 602 may transmit a similar geoquery packet at the expiration of the flight time of virtual ball 618, intended to verify the location of mobile communications device 600 at that time. The mobile communications devices 600 and/or 602, upon receiving geoquery response packets, may determine whether scoring events associated with the respective geoquery responses have already been recorded. If corresponding scoring events have already been recorded, the geoquery response packets may be ignored and/or discarded. If corresponding scoring events have yet to be recorded, the respective mobile communications devices may record scoring events and transmit geogame message packets associated with the scoring events.

Figure 7A:
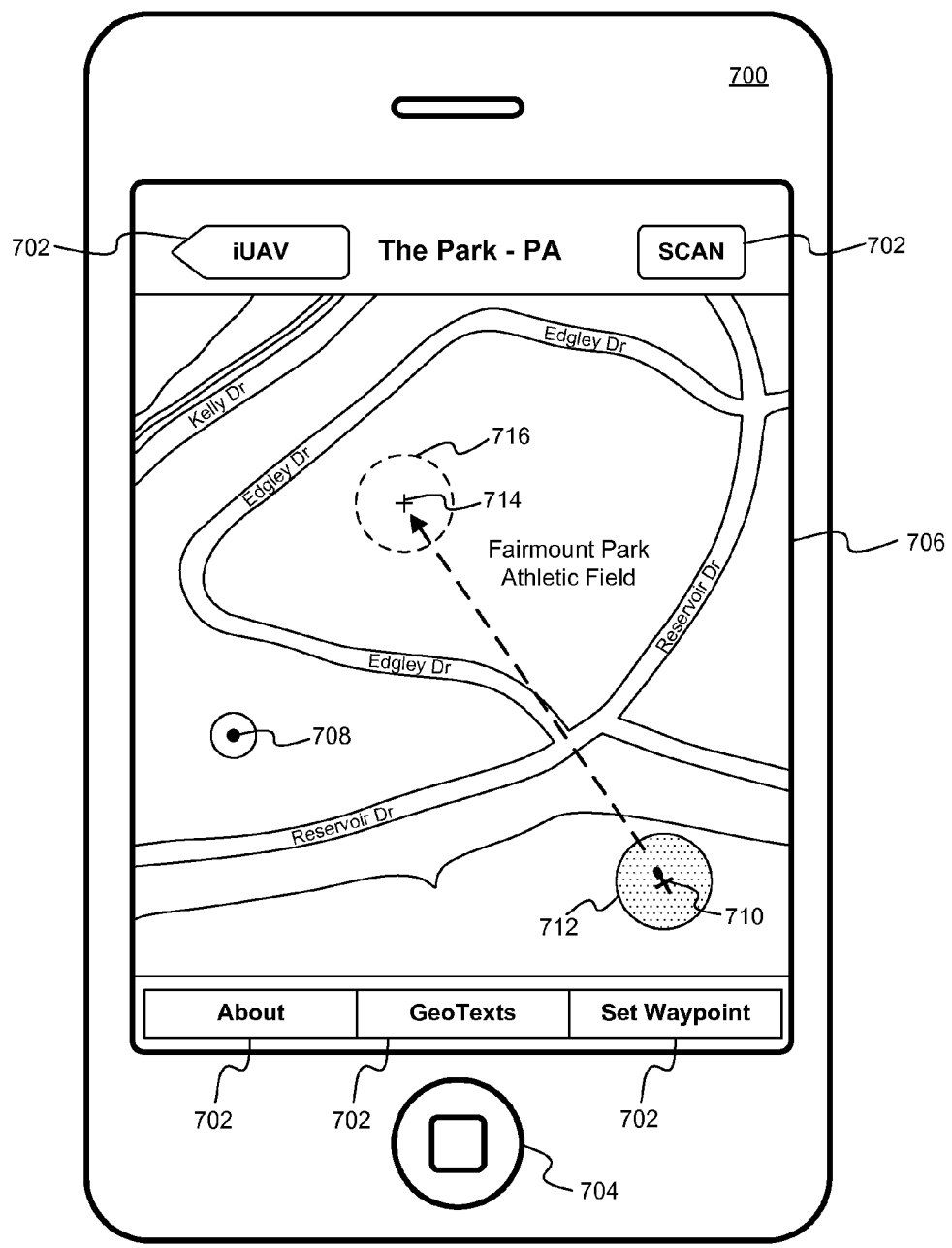
FIGS. 7A-7B depict the implementation of a virtual reconnaissance element within a reconnaissance simulation on a mobile communications device.
Figure 7B:
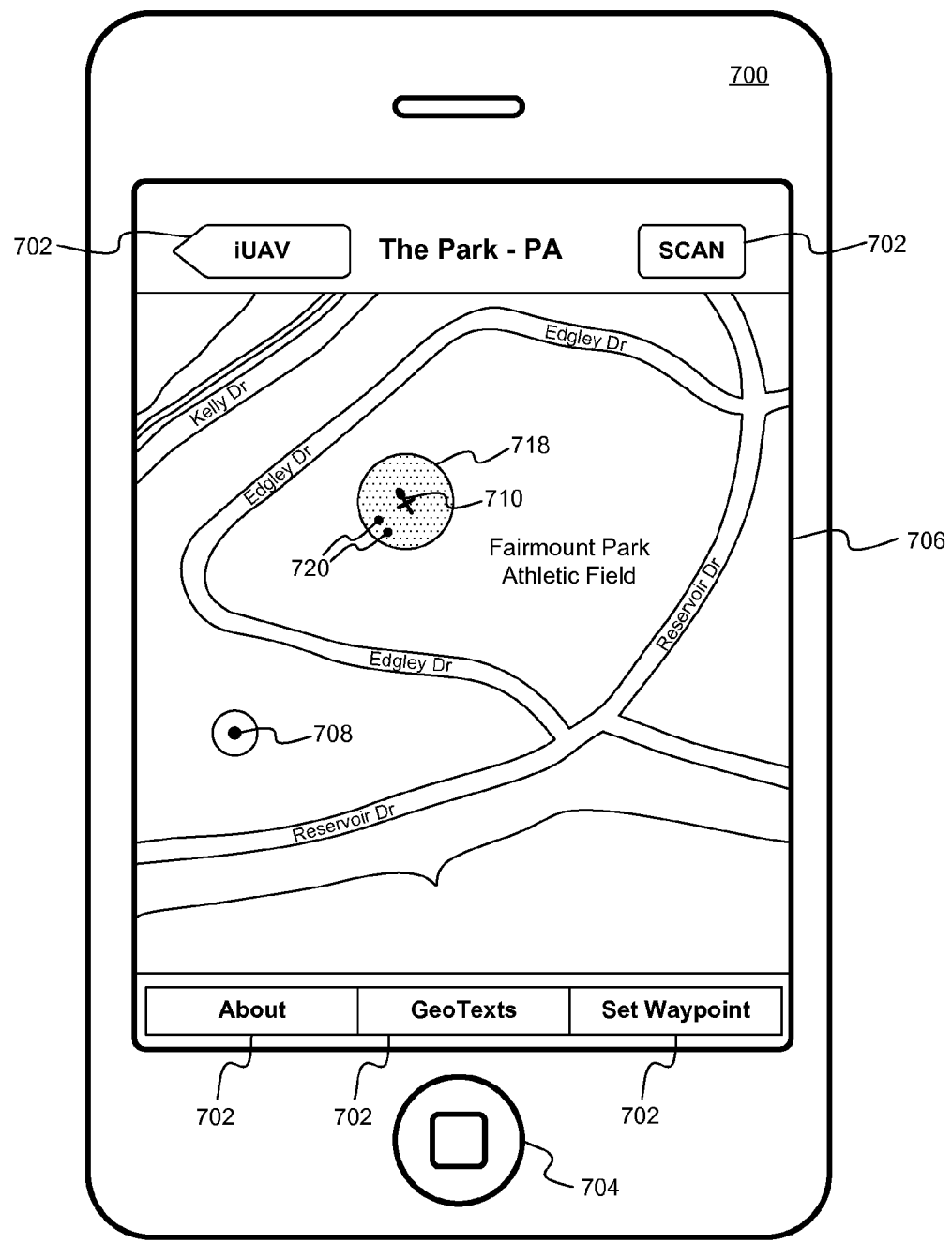

FIGS. 7A-7B depict an example embodiment of implementing a reconnaissance simulation geogame element ("recon element") using the disclosed systems and methods of multiplayer gaming via geocast messaging. A recon element may be used to conduct "scans" of a virtual or real-world playing field, thus simulating the behavior of a real-world unmanned aerial vehicle ("UAV") equipped with detection equipment such as down-looking optics. A recon element may be implemented within a geogame simulation, such as the artillery simulation described with reference to FIG. 5. Alternatively, a recon element may be integrated with games that are traditionally non-networked in nature, such as paintball or laser tag. Mobile communications device 700 is configured for wireless, scalable, multiplayer gaming using geographic messages exchanged via a wireless geographic broadcast ("geocast") protocol. A reconnaissance geogame element may be controlled via control features of mobile communications device 700, including software buttons 702, hardware buttons 704, a touch-sensitive display 706, audible commands, physical translation and/or rotation of the communications device 700 about a set of x, y, and z axes, or any combination thereof. A displayed representation of a geographic region corresponding to a virtual playing field may be rendered on display 706. The geographic region may correspond to a real-world geographic location. The representation may comprise a street map, a relief map, a satellite image, a photograph, a 3D environment, a video feed, or any combination thereof. The playing field representation may be overlaid with one or more additional representations, for example a player location 708 indicating a position of communications device 700 on the virtual playing field. The representations on display 706 may be updated in real-time to reflect changes to the geographic region representing the playing field and/or virtual or real-world location changes of geogame game elements and/or geogame players corresponding to the overlaid representations.

A recon element may be invoked by a geogame player through the use of any combination of the control features of mobile communications device 700 described above. For example, a user of the mobile communications device 700 may invoke a recon element by tapping a finger on the touch-sensitive display 706 of the mobile communications device 700. Once invoked, a recon indicator 710 representing the location of the recon element in relation to a virtual playing field may be rendered on display 706. The location at which a recon element appears when invoked by a user of mobile communications device 700 may be selected by the user, determined by geogame software and/or hardware, or a combination thereof. A scanning area 712 may optionally be rendered with recon indicator 710. In an embodiment, a scanning area may comprise a geographic region defined by a scan radius (not shown) extending from and encircling the geographic location of the recon element. In an embodiment, the length of the scan radius, and thus the size of the scanning area 712, may be a pre-defined or default setting within geogame software and/or hardware, may be agreed-to or otherwise defined by one or more geogame players, or any combination thereof. The scan area may also comprise a volume if an altitude value is assigned to the recon element. In another embodiment, the scanning radius may be dynamically controlled and/or adjusted by a geogame player during game play. For example, directing the recon element to fly at a higher altitude may provide a larger scan area, but at a lower resolution.

The geographic location of a recon element may be dynamic, allowing it to be moved around a virtual and/or real-world playing field based on commands issued by a user of mobile communications device 700. Movement of the recon element may be initiated by a user of mobile communications device 700 designating a waypoint corresponding to a new physical location for the recon element. The waypoint may comprise a point in two dimensional, or three dimensional, space. A waypoint may be designated by a user through the use of any combination of the control features of mobile communications device 700 described above. A waypoint indicator 714 representing the geographic location designated for the waypoint may be rendered on display 706. An indication of the scanning area at the waypoint 716 may optionally be rendered in combination with the waypoint indicator 714. The designation of a waypoint location for a recon element may automatically trigger the movement of the recon element from its existing geographic location to the waypoint geographic location. Alternatively, movement of the recon element from its existing location to the waypoint may separately be triggered by a user of mobile communications device 700 after the waypoint location has been designated and/or adjusted via waypoint indicator 714.

Once a user of mobile communications device 700 has designated a waypoint represented by waypoint indicator 714, a virtual travel time for the recon element may be calculated. The virtual travel time may simulate time required for a real-world recon element to travel between the current geographic location of the recon element and the geographic locations corresponding to the waypoint. The virtual travel time may be calculated by the mobile communications device 700 based upon the distance between the current geographic location of the recon element and the geographic location of the waypoint, and using virtual element characteristics (e.g., size, weight, and flight characteristics of the virtual recon element) and/or real-world variables (temperature, humidity, wind speed, wind direction, weather, etc.). The ability of the recon element to scan may be disabled by the geogame software and/or hardware while it is moving to a designated waypoint location. Thus, the recon element may be unusable for a designated period of time equivalent to the virtual travel time once movement to a waypoint has been triggered. In another embodiment, the recon element will be available to conduct scans along a virtual flight path between its previous geographic location and a designated waypoint location. In yet another embodiment, a flight pattern (not shown) for the recon element may be designated by a user of mobile communications device 700. For example, a circular flight pattern centered on a waypoint may be designated. When such a flight pattern is designated the recon element, upon reaching the waypoint, may continuously follow a circular virtual flight path centered on the waypoint, conducting scans periodically at points along the flight path, until a new waypoint is designated. The radius of such a flight path from the waypoint may be determined by the geogame software and/or hardware, specified by the user of the mobile communications device 700, or a combination thereof.

FIG. 7B depicts a virtual scan being performed by the recon element at the designated waypoint. A virtual scan may be implemented by transmitting a geographic query message packet ("geoquery") to a geographic region encompassing the scanning area 718. The geoquery packet may comprise multiple portions, including destination and sending address portions, and/or a geogame identifier portion indicative of the packet's association with a geogame in progress. In an embodiment, the destination address portion may define a geographic region corresponding to the scanning area 718. In another embodiment, the geographic region defined by the destination address portion may be an area larger than, but still encompassing, the scanning area 718. By defining the geographic region to be larger than the scanning area, communications devices participating in the simulation that are not located within the scanning area at the time the geoquery message is sent but may be moving towards it, may be included within the simulation. For example, if a resolution and/or focus change is being simulated for the recon element, a communications device moving at a high rate of speed may be tracked as it enters the larger area and eventually the scanning area during a delay associated with the simulated resolution and/or focus change. The sending address portion may indicate the virtual geographic location of the recon element when the geoquery packet was originally sent. The geogame identifier portion may act as a flag for receiving mobile communications devices, indicating that the packet is associated with a reconnaissance simulation geogame, and more particularly a virtual scan from a recon element associated with mobile communications device 700. The identifier portion allows receiving mobile communications devices not participating in the respective geogame to disregard processing of the geoquery packet. Receiving mobile communications devices participating in the geogame may, upon receiving the geoquery packet, process the geoquery packet, determine their current geographic location, compare it with the geographic region defined by the destination address portion, and if the destination address portion and the current geographic location of the receiving mobile communications device overlap, transmit a geoquery response message packet.

In an embodiment, a geoquery response message packet may comprise multiple portions, including a destination address portion defining a geographic region corresponding to a virtual playing field associated with the geogame, a sending address portion indicative of the geographic location of the receiving communications device at the time the geoquery message was received, and/or a scan response portion. The scan response portion may indicate that the geoquery response message is intended for processing by mobile communications device 700, and may indicate whether the receiving mobile communications device is associated with a friend or foe of the user of mobile communications device 700. In another embodiment, a geoquery response message may be formatted and/or transmitted using a form of connectivity other than geographic broadcasting, for example an IP addressed packet received via the Internet.

If mobile communications devices associated with other geogame players participating in the respective geogame are located within the geographic region corresponding to the scanning area 718, mobile communications device 700 may receive geoquery response packets from those mobile communications devices. By processing the geoquery response packets, the mobile communications device 700 may determine whether the users of the responding mobile communications devices are friends or foes of the user of the mobile communications device 700. The geographic locations of the responding mobile communications devices may be rendered on the display 706 as friend or foe indicators 720. It should be noted that the dots are used in FIG. 7B to represent the friend or foe indicators 720 are merely example indicators, and the scope of the instant disclosure should not be limited thereto. Indicators of different shapes, sizes, colors, and/or behaviors could be used to distinguish a friend from a foe on display 706.

Figure 8:
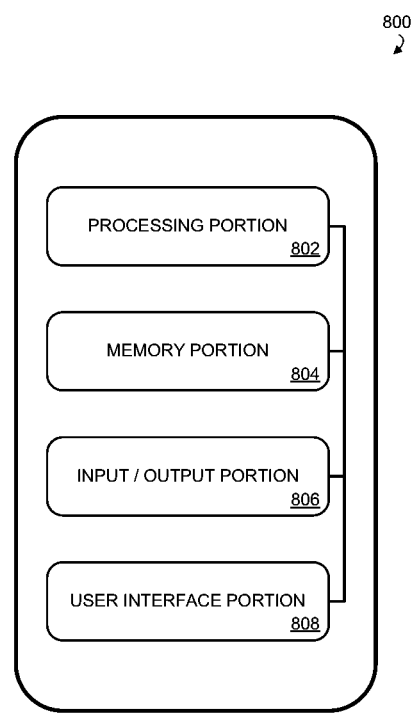
FIG. 8 is a block diagram of an example communications device configured to communicate in an ad hoc network of communications devices in accordance with a scalable wireless geographic protocol.

FIG. 8 is a block diagram of an example communications device 800 configured to communicate in an ad hoc network of communications devices in accordance with a scalable wireless geocast protocol. In an example configuration, communications device 800 is a mobile wireless device. The communications device can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The communications device 800 can include devices that are not typically thought of as portable, such as, for example, a public computing device, a navigation device installed in-vehicle, a set top box, or the like. The communications device 800 can include non-conventional computing devices, such as, for example, a kitchen appliance, a motor vehicle control (e.g., steering wheel), etc., or the like.

The communications device 800 can include any appropriate device, mechanism, software, and/or hardware for communication in an ad hoc network of communications devices in accordance with a scalable wireless geocast protocol as described herein. In an example embodiment, the ability to communicate in an ad hoc network of communications devices in accordance with a scalable wireless geocast protocol is a feature of the communications device 800 that can be turned on and off. Thus, an owner of the communications device 800 can opt-in or opt-out of this capability.

In an example configuration, the communications device 800 comprises a processing portion 802, a memory portion 804, an input/output portion 806, and a user interface (UI) portion 808. It is emphasized that the block diagram depiction of communications device 800 is exemplary and not intended to imply a specific implementation and/or configuration. For example, in an example configuration, the communications device 800 comprises a cellular phone and the processing portion 802 and/or the memory portion 804 are implemented, in part or in total, on a subscriber identity module (SIM) of the communications device. In another example configuration, the communications device 800 comprises a laptop computer. The laptop computer can include a SIM, and various portions of the processing portion 802 and/or the memory portion 804 can be implemented on the SIM, on the laptop other than the SIM, or any combination thereof.

The processing portion 802, memory portion 804, and input/output portion 806 are coupled together to allow communications therebetween. In various embodiments, the input/output portion 806 comprises a receiver of the communications device 800, a transmitter of the communications device, or a combination thereof. The input/output portion 806 is capable of receiving and/or providing information pertaining to communication in an ad hoc network of communications devices in accordance with a scalable wireless geocast protocol as described above. For example, the input/output portion 806 is capable of receiving and/or sending a message containing geographic information pertaining to a geogaming region, geogaming message content, and the like, as described herein. In an example embodiment, the input/output portion is capable of receiving and/or sending information to determine a location of the communications device. In an example configuration, the input\output portion 806 comprises a GPS receiver. In various configurations, the input/output portion can receive and/or provide information via any appropriate means, such as, for example, optical means (e.g., infrared), electromagnetic means (e.g., RF, Wi-Fi, Bluetooth®, ZigBee™, etc.), acoustic means (e.g., speaker, microphone, ultrasonic receiver, ultrasonic transmitter), or a combination thereof.

The processing portion 802 is capable of performing functions pertaining to communicating in an ad hoc network of communications devices in accordance with a scalable wireless geocast protocol as described above. For example, the processing portion 802 is capable of determining message content, such as location information, geogaming message content, whether the communications device has previously received the same message at least a predetermined number of times, whether a sending communications device is closer than a minimum distance away, whether the communications device is closer to the center of a geocast region than any sending communications device from which a message was received, or the like, as described above. Message content can comprise text, maps, audio, video, pictures, graphics, images, multimedia, links to downloadable information, or any combination thereof.

In a basic configuration, the communications device 800 can include at least one memory portion 804. The memory portion can store any information utilized in conjunction with communicating in an ad hoc network of communications devices in accordance with a scalable wireless geocast protocol as described above. For example, the memory portion 804 is capable of storing information pertaining to a location of a communications device, a location of a geocast region, a content type, the number of times a message has previously been received by the communications device, whether a sending communications device is closer than a minimum distance, whether the communications device is closer to the center of a geocast region than any sending communications device from which a message was received, or a combination thereof, as described above. Depending upon the exact configuration and type of processor, the memory portion 804 can be volatile (such as some types of RAM), non-volatile (such as ROM, flash memory, etc.), or a combination thereof. The mobile communications device 800 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device.

The communications device 800 also can contain a user interface (UI) portion 808 allowing a user to communicate with the communications device. The UI portion is capable of rendering any information utilized in conjunction with communicating in an ad hoc network of communications devices in accordance with a scalable wireless geocast protocol as described above. For example, the UI portion can render geogaming message content or the like, as described above. The UI portion can provide the ability to control the communications device, via, for example, buttons, soft keys, voice actuated controls, a touch screen, movement of the communications device, visual cues (e.g., moving a hand in front of a camera integrated in the communications device (not shown)), or the like. The UI portion can provide visual information (e.g., via a display), audio information (e.g., via speaker), mechanically (e.g., via a vibrating mechanism), or a combination thereof. In various configurations, the UI portion 808 can comprise a display, a touch screen, a keyboard, an accelerometer, a motion detector, a speaker, a microphone, a camera, a tilt sensor, or any combination thereof. The UI portion 808 can comprise means for inputting biometric information, such as, for example, fingerprint information, retinal information, voice information, and/or facial characteristic information.

Although not necessary to implement communications in an ad hoc network of communications devices in accordance with a scalable wireless geocast protocol, the communications device 800 can be part of and/or in communications with various wireless communications networks and/or network components. Some of which are described below.

Figure 9:
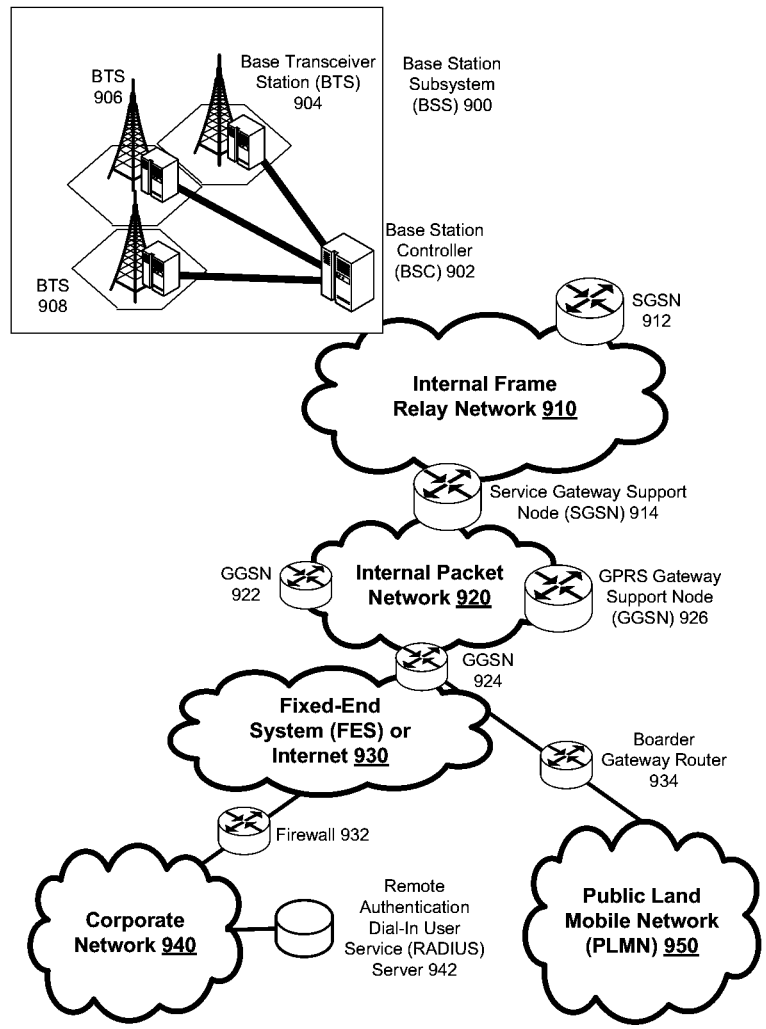
FIG. 9 depicts an example packet-based mobile cellular network environment, such as a GPRS network, in which communications in an ad hoc network of communications devices in accordance with a scalable wireless geographic protocol can be implemented.

FIG. 9 depicts an example packet-based mobile cellular network environment, such as a GPRS network, in which communications in an ad hoc network of communications devices in accordance with a scalable wireless geocast protocol can be implemented. In the example packet-based mobile cellular network environment shown in FIG. 9, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. BTSs 904, 906, 908, etc. are the access points where users of packet-based mobile devices become connected to the wireless network. In exemplary fashion, the packet traffic originating from user devices is transported via an over-the-air interface to a BTS 908, and from the BTS 908 to the BSC 902. Base station subsystems, such as BSS 900, are a part of internal frame relay network 910 that can include Service GPRS Support Nodes ("SGSN") such as SGSN 912 and 914. Each SGSN is connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 950, corporate intranets 940, or Fixed-End System ("FES") or the public Internet 930. As illustrated, subscriber corporate network 940 may be connected to GGSN 924 via firewall 932; and PLMN 950 is connected to GGSN 924 via boarder gateway router 934. The Remote Authentication Dial-In User Service ("RADIUS") server 942 may be used for caller authentication when a user of a mobile cellular device calls corporate network 940.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 10:
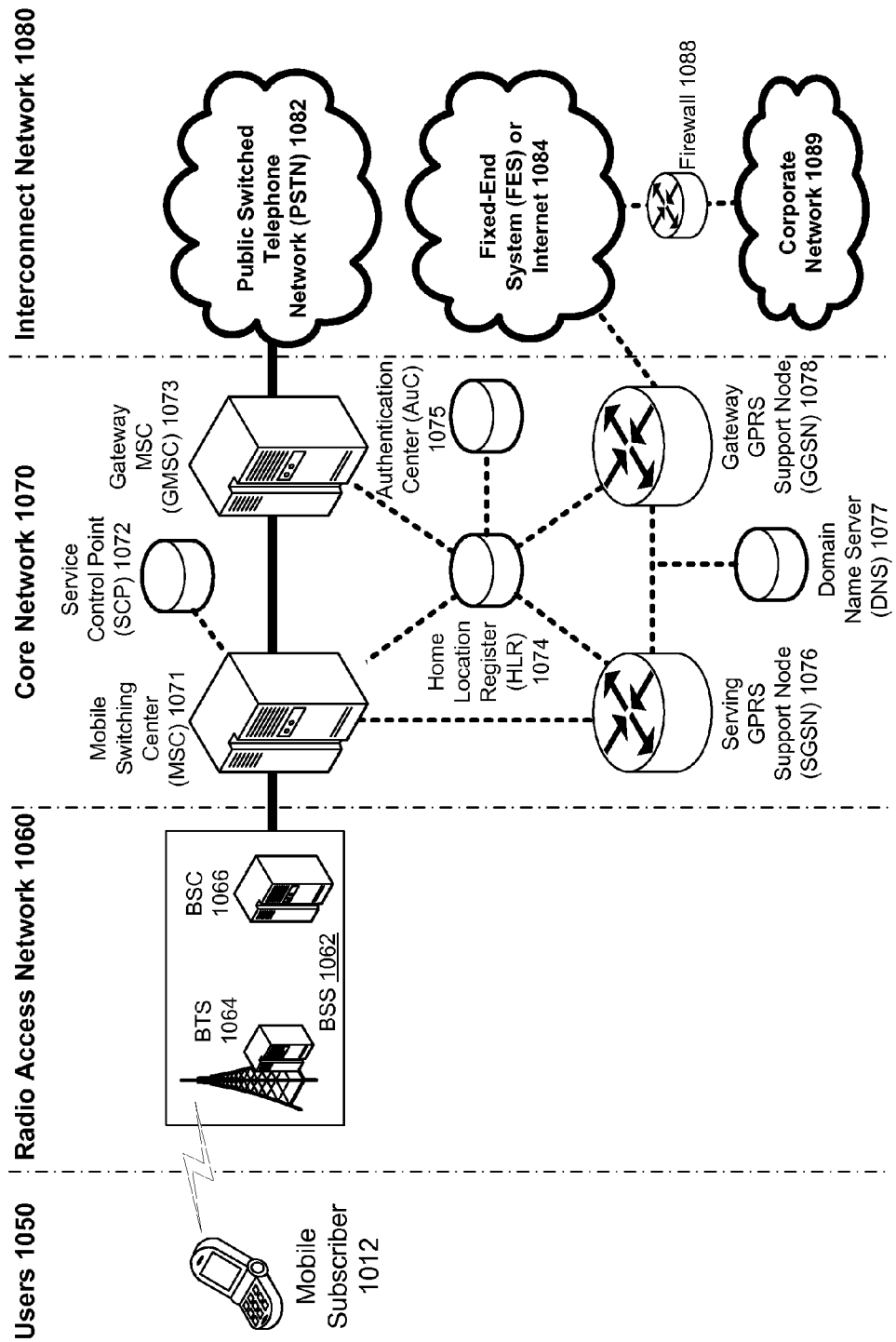
FIG. 10 depicts an example architecture of a typical GPRS network in which communications in an ad hoc network of communications devices in accordance with a scalable wireless geographic protocol can be implemented.

FIG. 10 illustrates an architecture of a typical GPRS network in which communications in an ad hoc network of communications devices in accordance with a scalable wireless geocast protocol can be implemented. The architecture depicted in FIG. 10 is segmented into four groups: users 1050, radio access network 1060, core network 1070, and interconnect network 1080. Users 1050 comprise a plurality of end users. Note: device 1012 is referred to as a mobile subscriber in the description of the network shown in FIG. 10. In an example embodiment, the device depicted as mobile subscriber 1012 comprises a communications device (e.g., communications device 800). Radio access network 1060 comprises a plurality of base station subsystems such as BSSs 1062, which include BTSs 1064 and BSCs 1066. Core network 1070 comprises a host of various network elements. As illustrated in FIG. 10, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 10, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when the mobile subscriber 1012 initiates the attach process by turning on the network capabilities of the mobile device, an attach request is sent by mobile subscriber 1012 to SGSN 1076. The SGSN 1076 queries another SGSN, to which mobile subscriber 1012 was attached before, for the identity of mobile subscriber 1012. Upon receiving the identity of mobile subscriber 1012 from the other SGSN, SGSN 1076 requests more information from mobile subscriber 1012. This information is used to authenticate mobile subscriber 1012 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 1012 was attached before, to cancel the location process for mobile subscriber 1012. HLR 1074 then notifies SGSN 1076 that the location update has been performed. At this time, SGSN 1076 sends an Attach Accept message to mobile subscriber 1012, which in turn sends an Attach Complete message to SGSN 1076.

After attaching itself with the network, mobile subscriber 1012 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 1012. The mobile subscriber 1012 uses an algorithm to send the user identification (ID) and password to SGSN 1076. The SGSN 1076 uses the same algorithm and compares the result. If a match occurs, SGSN 1076 authenticates mobile subscriber 1012.

Next, the mobile subscriber 1012 establishes a user session with the destination network, corporate network 1089, by going through a Packet Data Protocol ("PDP") activation process. Briefly, in the process, mobile subscriber 1012 requests access to the Access Point Name ("APN"), for example, UPS.com, and SGSN 1076 receives the activation request from mobile subscriber 1012. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1089. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 1012.

Once activated, data packets of the call made by mobile subscriber 1012 can then go through radio access network 1060, core network 1070, and interconnect network 1080, in a particular fixed-end system or Internet 1084 and firewall 1088, to reach corporate network 1089.

Figure 11:
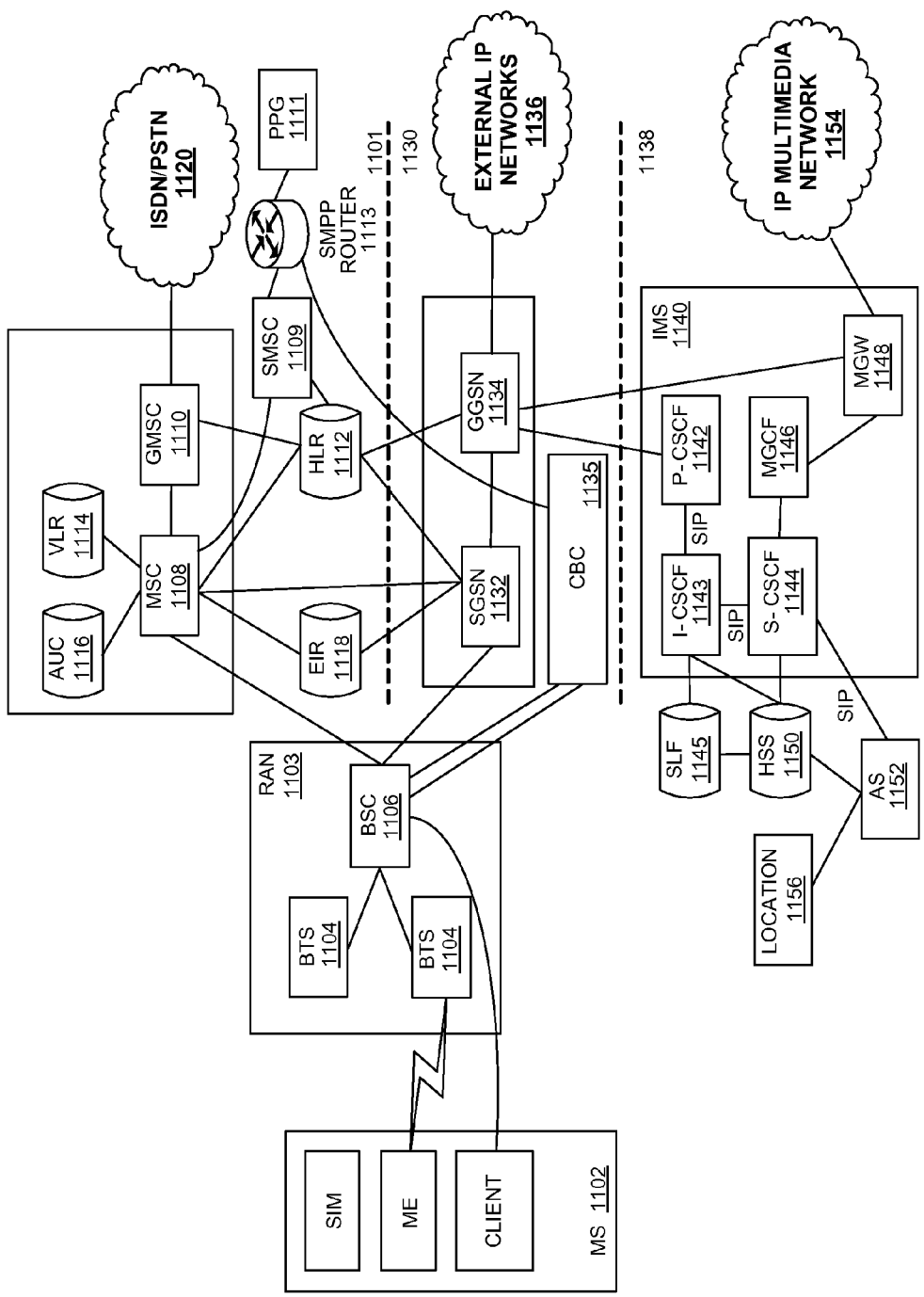
FIG. 11 depicts an example GSM/GPRS/IP multimedia network architecture within which communications in an ad hoc network of communications devices in accordance with a scalable wireless geographic protocol can be implemented.

FIG. 11 illustrates an example GSM/GPRS/IP multimedia network architecture within which communications in an ad hoc network of communications devices in accordance with a scalable wireless geocast protocol can be implemented. As illustrated, the architecture of FIG. 11 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer that is used by mobile subscribers, with a Subscriber Identity Module (SIM) or a Universal Integrated Circuit Card (UICC). The SIM or UICC includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station subsystem (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1116, and an Equipment Identity Register (EIR) 1118. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1135 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vise versa.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the predefined area.

The various techniques for geogaming described herein can be implemented in connection with hardware or software or, where appropriate, with a combination of both. Thus, the methods and apparatuses for transmitting geogaming messages and otherwise communicating in an ad hoc network of communications devices in accordance with a scalable wireless geocast protocol can be implemented, or certain aspects or portions thereof, can take the form of program code (i.e., instructions) embodied in tangible storage media, such as floppy diskettes, CD-ROMs, hard drives, or any other machine-readable storage medium (computer-readable storage medium), wherein, when the program code is loaded into and executed by a machine, such as a computer, the machine becomes an apparatus for geogaming. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for communicating in an ad hoc network of communications devices in accordance with a scalable wireless geocast protocol also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for geogaming. When implemented on a general-purpose processor, the program code combines with the processor to provide a unique apparatus that operates to invoke the functionality of communicating in an ad hoc network of communications devices in accordance with a scalable wireless geocast protocol. Additionally, any storage techniques used in connection with communicating in an ad hoc network of communications devices in accordance with a scalable wireless geocast protocol can invariably be a combination of hardware and software.

While transmission and propagation of multiplayer gaming messages via communications in an ad hoc network of communications devices in accordance with a scalable wireless geocast protocol have been described in connection with the various embodiments of the various figures, it is to be understood that other similar embodiments can be used or modifications and additions can be made to the described embodiments for transmission and propagation of multiplayer gaming messages in an ad hoc network of communications devices in accordance with a scalable wireless geocast protocol without deviating therefrom. For example, one skilled in the art will recognize that communicating in an ad hoc network of communications devices in accordance with a scalable wireless geocast protocol as described in the present application may apply to any environment, whether wired or wireless, and may be applied to any number of such devices connected via a communications network and interacting across the network. Therefore, transmission and propagation of multiplayer gaming messages in an ad hoc network of communications devices in accordance with a scalable wireless geocast protocol should not be limited to any single embodiment, but rather should be construed in breadth and scope in accordance with the appended claims.

What is claimed:

1. A method comprising:
    receiving, by an apparatus, a request to initiate a scan, via a virtual reconnaissance element having simulated movement, of a geographic region;
    responsive to receiving the request, transmitting, by the apparatus, to the geographic region, a query signal corresponding to a simulated location of the virtual reconnaissance element, the query signal formatted in accordance with a scalable geographic broadcast protocol comprising a geographic query address portion corresponding to the geographic region;
    receiving, by the apparatus, a query response signal from a sending device within the geographic region;
    determining, based on the received query response signal, a location of the sending device; and
    providing, by the apparatus, a designation of the location of the sending device.

2. The method of claim 1, further comprising:
    characterizing the sending device as one of a friend or a foe; and
    providing the designation in accordance with the characterization.

3. The method of claim 1, further comprising:
    receiving a designation of a waypoint;
    determining a current location of the virtual reconnaissance element;
    determining a distance between the waypoint and the current location;
    calculating a travel time between the current location and the waypoint based upon the distance and virtual reconnaissance element characteristics; and
    transmitting, at the elapse of the travel time, a second query signal.

4. The method of claim 1, wherein:
    the query signal comprises an indication of an intended recipient of the query signal; and
    the query signal comprises an indication of a response to the query signal be one of mandatory or voluntary.

5. The method of claim 1, further comprising rendering an indication of the location of the sending device on the apparatus.

6. The method of claim 5, wherein the designation is visually rendered as an overlay on a map of the geographic region.

7. The method of claim 1, further comprising rendering the location of the sending device on the apparatus based on the sending device being designated as friend or foe.

8. The method of claim 7, wherein the designation of friend or foe is rendered as an overlay on a map of the geographic region.

9. The method of claim 1, wherein a second query signal is transmitted in accordance with a rescan time.

10. An apparatus comprising:
    a processor; and
    memory coupled to the processor, the memory comprising executable instructions that when executed by the processor cause the processor to effectuate operations comprising:
        receiving a request to initiate a scan, via a virtual reconnaissance element having simulated movement, of a geographic region;
        responsive to receiving the request, transmitting to the geographic region, a query signal corresponding to a simulated location of the virtual reconnaissance element, the query signal formatted in accordance with a scalable geographic broadcast protocol comprising a geographic query address portion corresponding to the geographic region;
        receiving, via an ad hoc network, a query response signal from a sending device within the geographic region;
        determining, based on the received query response signal, a location of the sending device; and
        providing a designation of the location of the sending device.

11. The apparatus of claim 10, the operations further comprising:
    characterizing the sending device as one of a friend or a foe; and
    providing the designation in accordance with the characterization.

12. The apparatus of claim 10, the operations further comprising:
    receiving a designation of a waypoint;
    determining a current location of the virtual reconnaissance element;
    determining a distance between the waypoint and the current location;
    calculating a travel time between the current location and the waypoint based upon the distance and virtual reconnaissance element characteristics; and
    transmitting, at the elapse of the travel time, a second query signal.

13. The apparatus of claim 10, wherein:
    the query signal comprises an indication of an intended recipient of the query signal; and
    the query signal comprises an indication of a response to the query signal be one of mandatory or voluntary.

14. The apparatus of claim 10, the operations further comprising rendering an indication of the location of the sending device on the apparatus.

15. A computer-readable storage medium that is not a propagating signal, the computer-readable storage medium comprising executable instructions that when executed by a processor cause the processor to effectuate operations comprising:

receiving, by an apparatus, a request to initiate a scan, via a virtual reconnaissance element having simulated movement, of a geographic region;

responsive to receiving the request, transmitting, by the apparatus, to the geographic region, a query signal corresponding to a simulated location of the virtual reconnaissance element, the query signal formatted in accordance with a scalable geographic broadcast protocol comprising a geographic query address portion corresponding to the geographic region;

receiving, via an ad hoc network, a query response signal from a sending device within the geographic region;

determining, based on the received query response signal, a location of the sending device; and providing a designation of the location of the sending device.

16. The computer-readable storage medium of claim 15, the operations further comprising:

characterizing the sending device as one of a friend or a foe; and providing the designation in accordance with the characterization.

17. The computer-readable storage medium of claim 15, the operations further comprising:

receiving a designation of a waypoint;

determining a current location of the virtual reconnaissance element;

determining a distance between the waypoint and the current location;

calculating a travel time between the current location and the waypoint based upon the distance and virtual reconnaissance element characteristics; and transmitting, at the elapse of the travel time, a second query signal.

18. The computer-readable storage medium of claim 15, wherein:

the query signal comprises an indication of an intended recipient of the query signal; and the query signal comprises an indication of a response to the query signal be one of mandatory or voluntary.

19. The computer-readable storage medium of claim 15, the operations further comprising rendering an indication of the location of the sending device on the apparatus.

* * * * *

UNITED STATES PATENT AND TRADEMARK OFFICE
CERTIFICATE OF CORRECTION

PATENT NO.         : 8,751,159 B2                                    Page 1 of 1
APPLICATION NO.    : 12/644293
DATED              : June 10, 2014
INVENTOR(S)        : Robert J. Hall It is certified that error appears in the above-identified patent and that said Letters Patent is hereby corrected as shown below:

<u>Title Page</u>,
Item (75), Inventor:
After "Robert J Hall," delete "Berkeley Heig, NJ (US)" and insert -- Berkeley Heights, NJ (US) --.

Signed and Sealed this
Sixteenth Day of June, 2015

Michelle K. Lee
*Director of the United States Patent and Trademark Office*